(12) United States Patent
Woo et al.

(10) Patent No.: US 8,374,127 B2
(45) Date of Patent: Feb. 12, 2013

(54) DIGITAL BROADCASTING SYSTEM AND METHOD OF PROCESSING DATA IN DIGITAL BROADCASTING SYSTEM

(75) Inventors: Sang Rea Woo, Goyang-si (KR); Chang Ho Shin, Osan-si (KR)

(73) Assignee: LG Electronics Inc., Seoul (KR)

(*) Notice: Subject to any disclaimer, the term of this patent is extended or adjusted under 35 U.S.C. 154(b) by 651 days.

(21) Appl. No.: 12/605,748

(22) Filed: Oct. 26, 2009

(65) Prior Publication Data

US 2011/0099589 A1  Apr. 28, 2011

(51) Int. Cl.
- H04W 4/00 (2009.01)
- H04M 1/66 (2006.01)
- H04N 7/167 (2011.01)
- H04K 1/00 (2006.01)
- G06F 15/16 (2006.01)
- G06F 15/173 (2006.01)
- G05B 29/00 (2006.01)

(52) U.S. Cl. ........ 370/328; 455/410; 455/411; 380/201; 380/247; 380/270; 709/219; 709/225; 709/202; 725/31; 340/5.8

(58) Field of Classification Search .............. 370/219; 726/2–4; 455/410, 411; 709/212–219, 223–226; 709/220; 380/200–202; 725/25, 31

See application file for complete search history.

(56) References Cited

U.S. PATENT DOCUMENTS

| | | | |
|---|---|---|---|
| 5,721,781 A * | 2/1998 | Deo et al. | 705/67 |
| 6,600,958 B1 | 7/2003 | Zondag | |
| 2002/0186121 A1* | 12/2002 | Yoshikawa et al. | 340/5.28 |
| 2005/0154795 A1* | 7/2005 | Kuz et al. | 709/227 |
| 2006/0031436 A1* | 2/2006 | Sakata et al. | 709/221 |
| 2006/0125652 A1* | 6/2006 | Zigmond et al. | 340/825.72 |
| 2007/0217436 A1 | 9/2007 | Markley et al. | |

FOREIGN PATENT DOCUMENTS

| KR | 10-2003-0056876 | 7/2003 |
|---|---|---|
| WO | WO 2004/081713 | 9/2004 |

* cited by examiner

Primary Examiner — Alpus H Hsu
Assistant Examiner — Dharmesh Patel
(74) Attorney, Agent, or Firm — McKenna Long & Aldridge LLP

(57) ABSTRACT

A method is provided for controlling a mobile device capable of accessing an AP card of a DTV located in one independent space among a plurality of independent spaces physically separated from one another. The method includes accessing a management server using the AP card, downloading an in-room control application from the management server, requesting a unique access code from the management server using the AP card if the downloaded in-room control application is executed, wherein the unique access code is mapped to both an ID of the AP card and an available term assigned to a current guest staying in the independent space, receiving the unique access code from the management server, and transmitting a command signal for changing a status of a controllable device contained in the independent space and the received unique access code to the AP card of the DTV.

4 Claims, 26 Drawing Sheets

Code = 1         (Access-Request)
ID = 1
Length = 71
Request Authenticator = {16 octet random number also used as CHAP challenge}
Attributes:
User-Name = "flopsy"
CHAP-Password = { 1 octet CHAP ID followed by 16 octet
          CHAP response}

NAS-IP-Address = 192.168.1.16
NAS-Port = 20
Service-Type = Framed-user
Framed-Protocol = PPP Code = 2         (Access-Accept)
ID = 1           (same as in Access-Request)
Length =56
Response Authenticator = { 16-octet MD-5 checksum of the code (2), id (1),
          Lenth (56), the Request Authenticator from above,
          the attributes in this reply, and the shared secret}
Attributes:
Service-Type = Framed-User
Framed-Protocol = PPP
Framed-IP-Address = 255.255.255.254
Framed-Routing = None
Framed-Compression = 1    (VJ TCP/IP Header Compression)
Framed-MTU = 1500

(a)　　　　　　　(b)　　　　　　　(c)

DIGITAL BROADCASTING SYSTEM AND METHOD OF PROCESSING DATA IN DIGITAL BROADCASTING SYSTEM

FIELD OF THE INVENTION

The present invention relates to a technology for controlling a Radio Frequency (RF) head end system and a plurality of TV sets in a limited space such as a hotel or hospital, and more particularly to a method for transmitting a signal to a TV set of a specific room from among a plurality of TV sets installed in respective rooms of a hotel or hospital using a multiple access point control system defined in the following description.

DISCUSSION OF THE RELATED ART

Generally, a broadcast receiver receives a data stream including a broadcast signal, extracts a video and audio data stream corresponding to a user desired channel using service information contained in the received data stream, and outputs the extracted video and audio data stream to a display device.

However, according to the related art, detailed protocols or methods for more effectively transmitting and processing data to each room of a limited space such as a hotel or hospital are not defined yet.

SUMMARY OF THE INVENTION

An object of the present invention is to provide a technology for enabling a guest who lodges in a hotel room, etc. to easily control devices contained in the room.

Another object of the present invention is to provide a technology wherein, although a guest of the hotel is located at the interior or exterior of a room, the guest is able to control devices contained in the room and to check a current status at any time.

To achieve these objects and other advantages and in accordance with the purpose of the invention, as embodied and broadly described herein, a method is provided for controlling a mobile device capable of accessing an access point (AP) card of a digital television (DTV) located in one independent space among a plurality of independent spaces physically separated from one another, the method including accessing a management server using the AP card, downloading an in-room control application from the management server, requesting a unique access code from the management server using the AP card if the downloaded in-room control application is executed, wherein the unique access code is mapped to both an identifier (ID) of the AP card and an available term assigned to a current guest staying in the independent space, receiving the unique access code from the management server, and transmitting a command signal for changing a status of a controllable device contained in the independent space and the received unique access code to the AP card of the DTV.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 19 illustrates a general authentication request packet and a general authentication accept packet according to the present invention.

DETAILED DESCRIPTION OF THE INVENTION

Figure 1:
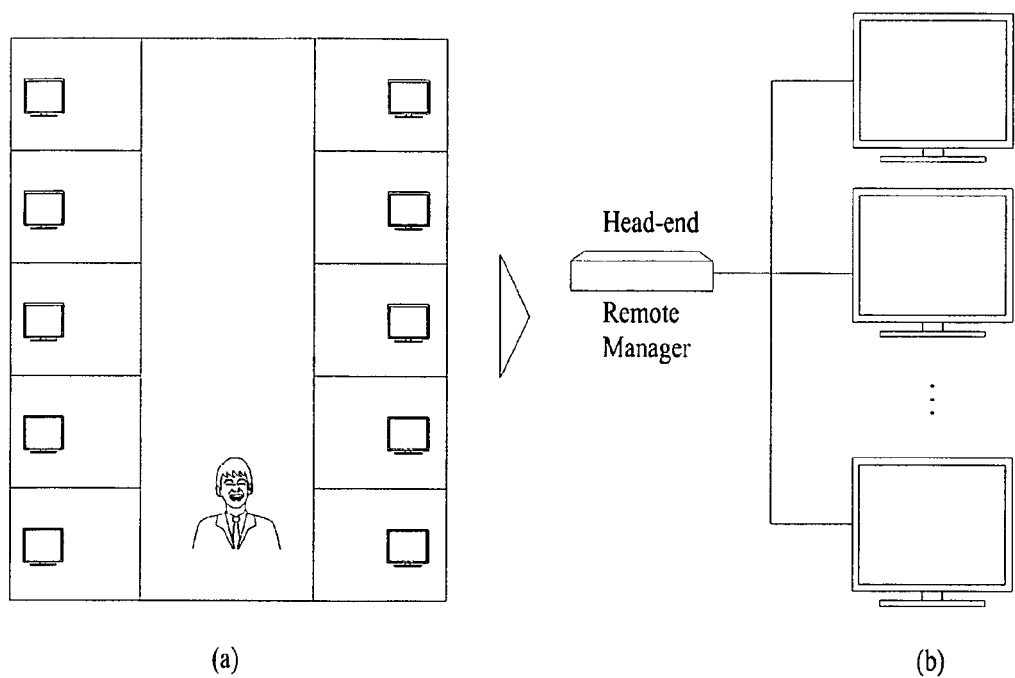
FIG. 1 is a diagram illustrating a multiple access point control system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

In accordance with the following embodiments of the present invention, a system for controlling a multiple access point using a multiple access point control system is proposed. For example, the access point may be a part for providing information to each limited physical space, communicating with devices contained in the physical space, and controlling the devices. By means of the multiple access point control system, a specific access point may provide information to a user located in a corresponding physical space. In addition, the devices located in the physical space may communicate with a server located outside of the physical space through the access point.

In addition, the term 'physical space' is separated from a communication space, such as a cell, defined in a wireless field. The cell acting as the communication space is in the range that is affected by radio waves from a specific base station, such that a user equipment (UE) can communicate with a corresponding base station in the above-mentioned range. However, the access point may be a part for controlling and managing a specific physical space or local area (e.g., each room of a hotel or hospital). Although the devices contained in the physical space can communicate with an access point of another physical space, the devices communicate with the access point of the corresponding physical space, and as such a detailed example thereof will hereinafter be described.

The multiple access point control system may transfer the same information to a corresponding physical space through a multiple access point, or may transfer different information to individual physical spaces. The multiple access point control system may control the access point at a remote site such that information suitable for a user of a physical space including the access point can be independently provided. In accordance with one embodiment of the present invention, the server of the multiple access point control system includes a user interface capable of allowing a person who controls the server to easily control the multiple access point.

The access point may be arranged at a specific position of each physical space. In order to easily provide information to the user, the access point may be configured in the form of a card, such that it can be inserted into a television or a set-top box. In accordance with one embodiment of the present invention, the card-type access point designed to be inserted into a television or set-top box may also be abbreviated to an AP. In the case where the AP card is inserted into the television, the user can recognize information to be transmitted through the AP card by viewing the television.

Such a system may be located at a variety of places, for example, a hotel, a hospital, a school, a prison, etc. For convenience of description and better understanding of the present invention, it is assumed that the above-mentioned system is located at a hotel such that the multiple access point and a control system thereof are operated in the hotel. However, the scope and spirit of the present invention are not limited thereto, and the present invention is also applicable to other examples.

In the case of the hotel, a user lodges in the hotel, such that the user can view content such as broadcast content through a TV. If content provided to a user of a room through the TV is pay-per-view content, an accounting system connected to the TV can charge a usage fee to user-viewed content. However, a driving circuit associated with the accounting system is installed in each TV. If there is a need to upgrade a corresponding system, a hotel administrator who uses the related art must upgrade TV systems installed in all rooms, resulting in greater inconvenience of use.

In addition, since administrating all rooms is manually carried out by the hotel administrator, a large hotel having many rooms consumes an unnecessarily long period of time and great cost to manage such rooms.

With the increasing number of guests or lodgers who use wireless communication, there are many cases wherein a wireless communication network is installed in each floor of a hotel. However, there is a difficulty in providing enough bandwidth for all guests of respective floors to easily use the wireless communication network, such that it causes greater inconvenience to a guest or administrator of a hotel.

In the case of an old hotel, a hotel history may be considered to be a brand value of the hotel. In order to provide each room of the hotel with a control system, a communication system, and another system that allows individual services to be executed in all rooms, a large amount of costs are consumed. If the hotel architecture is changed to another to install the above-mentioned systems, the hotel prestige or value may be greatly deteriorated.

Therefore, according to the following embodiments of the present invention, if individual services are provided to users of rooms serving as different physical spaces, and an access point capable of entirely managing the rooms is installed in each room, the following embodiments can solve the above-mentioned problems by controlling only the access point of each room without great modification of a conventional hotel design. A multiple access point control system according to one embodiment of the present invention will hereinafter be described with reference to the annexed drawings.

FIG. 1 is a diagram illustrating a multiple access point control system according to one embodiment of the present invention. FIG. 1(a) shows a conventional hotel management system. FIG. 1(b) shows a multiple access point control system according to one embodiment of the present invention.

In accordance with the related art shown in FIG. 1(a), if a hotel administrator desires to upgrade a system applied to a TV of each room, the hotel administrator has to manually upgrade TVs of all rooms of the hotel. In other words, as shown in FIG. 1(a) illustrating the related art, if a device in any one room is wrongly operated or an empty room is brightly lit, the hotel administrator should directly visit each room so as to correct the incorrect operation of the device or switch off the light of the empty room.

The above-mentioned inconvenience will hereinafter be described in detail from the economic point of view.

Provided that a cost required for upgrading a TV driving circuit of each room once is denoted by 'a', the number of rooms is denoted by 'b', the number of software upgrade times every year is denoted by 'c', and a lifetime of a TV is denoted by 'd', a total cost 'a×b×c×d' is continuously consumed to maintain such a system.

FIG. 1(b) shows an exemplary case in which a multiple access point control system controls an access point of each room according to one embodiment of the present invention. It is assumed that the access point is configured in the form of a card such that the card-type access point is inserted into a TV. The hotel administrator controls an access point card of each room using a headend (server) connected to a TV of each room. The access point card can provide an individual service to a user of each room through a TV under the remote control of a headend. In addition, the access point card may communicate with a device of each room, or may control a variety of devices installed in each room.

Most hotels include an installation for a Video On Demand (VOD) accounting service for a TV. If an access point card is installed in the TV, each hotel can provide many more services to the user through the access point card. Therefore, a multiple access point control system can be easily installed in the hotel having many physical spaces, and can also be easily managed and maintained by the hotel administrator.

A variety of services can be provided to a user through the TV having the access point card. Exemplary services are as follows. If the user enters the room, a hotel logo is displayed on the TV, and a message including respective user names can be displayed on the TV.

In addition, the hotel notification or the hotel advertisement, etc. can be displayed on the TV, and travel or transportation information can be provided to the user. In addition, user desired information of respective rooms can be separately provided to individual rooms, and a detailed description thereof will hereinafter be described in detail.

Figure 2:
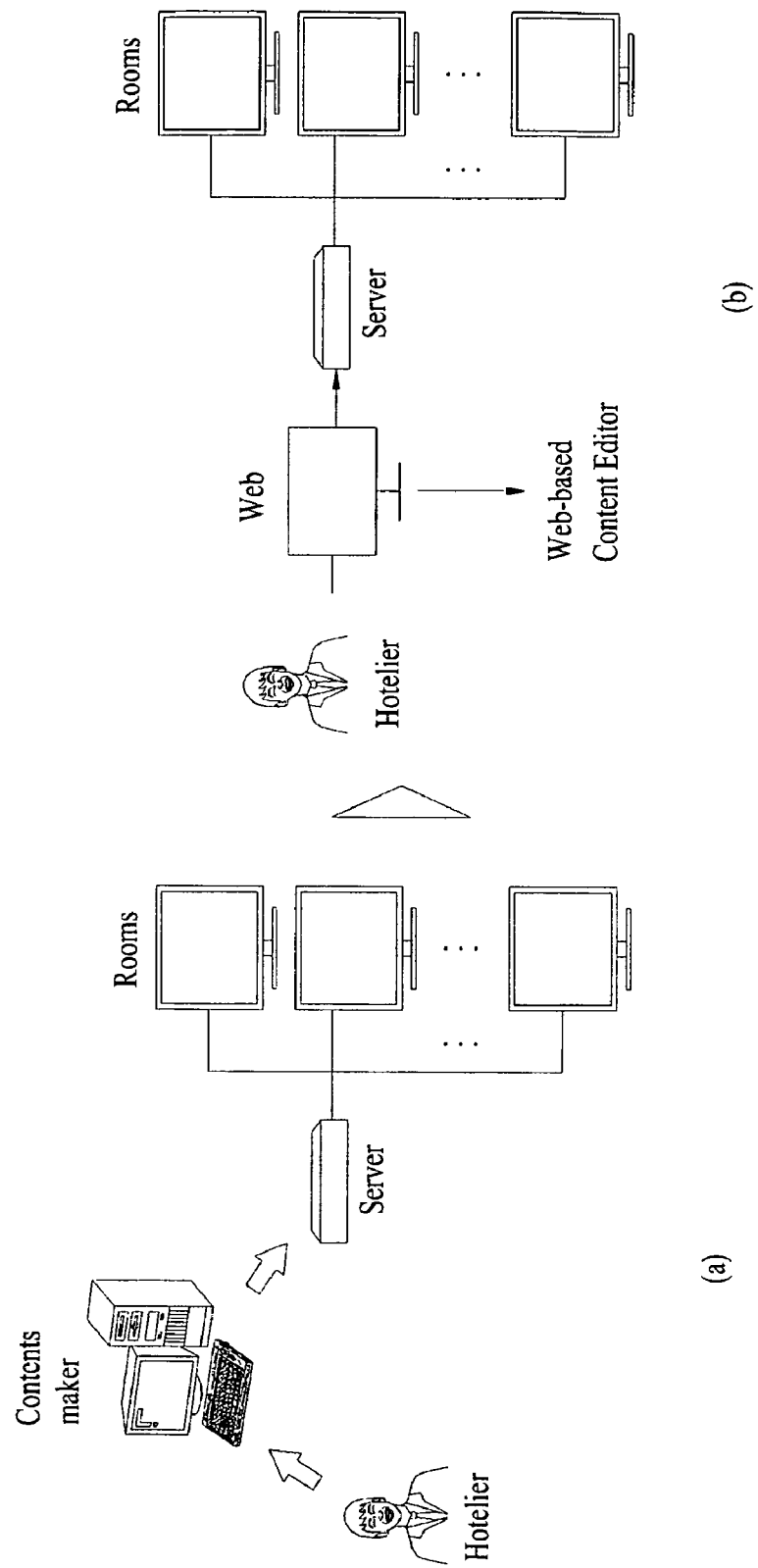
FIG. 2 is a diagram illustrating a multiple access point control system according to another embodiment of the present invention.

FIG. 2 is a diagram illustrating a multiple access point control system according to another embodiment of the present invention. FIG. 2(a) shows a system for allowing a hotel to charge an additional fee through a TV according to the related art. FIG. 2(b) is a diagram illustrating a multiple access point control system according to another embodiment of the present invention.

Referring to FIG. 2(a), the hotel administrator asks an external content provider or a system administrator either to manage a server for controlling TVs of respective rooms or to provide content. Accordingly, according to the related art, the content provider or the system administrator controls and manages not only content, that must be provided to the user through the TV, but also an accounting system for the content, and therefore, the TV of each room can provide a pay-per-view service to the user of each room.

According to the related art, if the hotel administrator changes a pay-per-view service to another service, the hotel administrator cannot directly control a detailed description required for the changed service. In the case of changing the system operation, the hotel administrator has difficulty in changing such a system operation under the condition that the hotel administrator sends the external content provider no request. In other words, it is next to impossible for the hotel administrator to change or manipulate services provided to each room independently from the system administrator.

Referring to FIG. 2(b), the server of the multiple access point system according to another embodiment of the present invention can allow the hotel administrator to directly provide content to a user of each room, and can also allow the hotel administrator to provide different information to the user. For example, the server for use in the multiple access point control system may have a Web-based editor. The user interface of the multiple access point control system can allow the hotel administrator to conveniently manage respective rooms, such that the hotel administrator can conveniently provide requirements of each room and an individual service that must be provided to each room.

The hotel administrator can edit services provided to each room using the user interface and the Web-based editor, such that individual or common services can be provided to respective rooms. If the hotel administrator edits the Web-based editor, the server of the multiple access point system can easily transmit an additional message to a user of a specific room, or can transmit specific content to the user. A detailed description thereof will hereinafter be described in detail.

Figure 3:
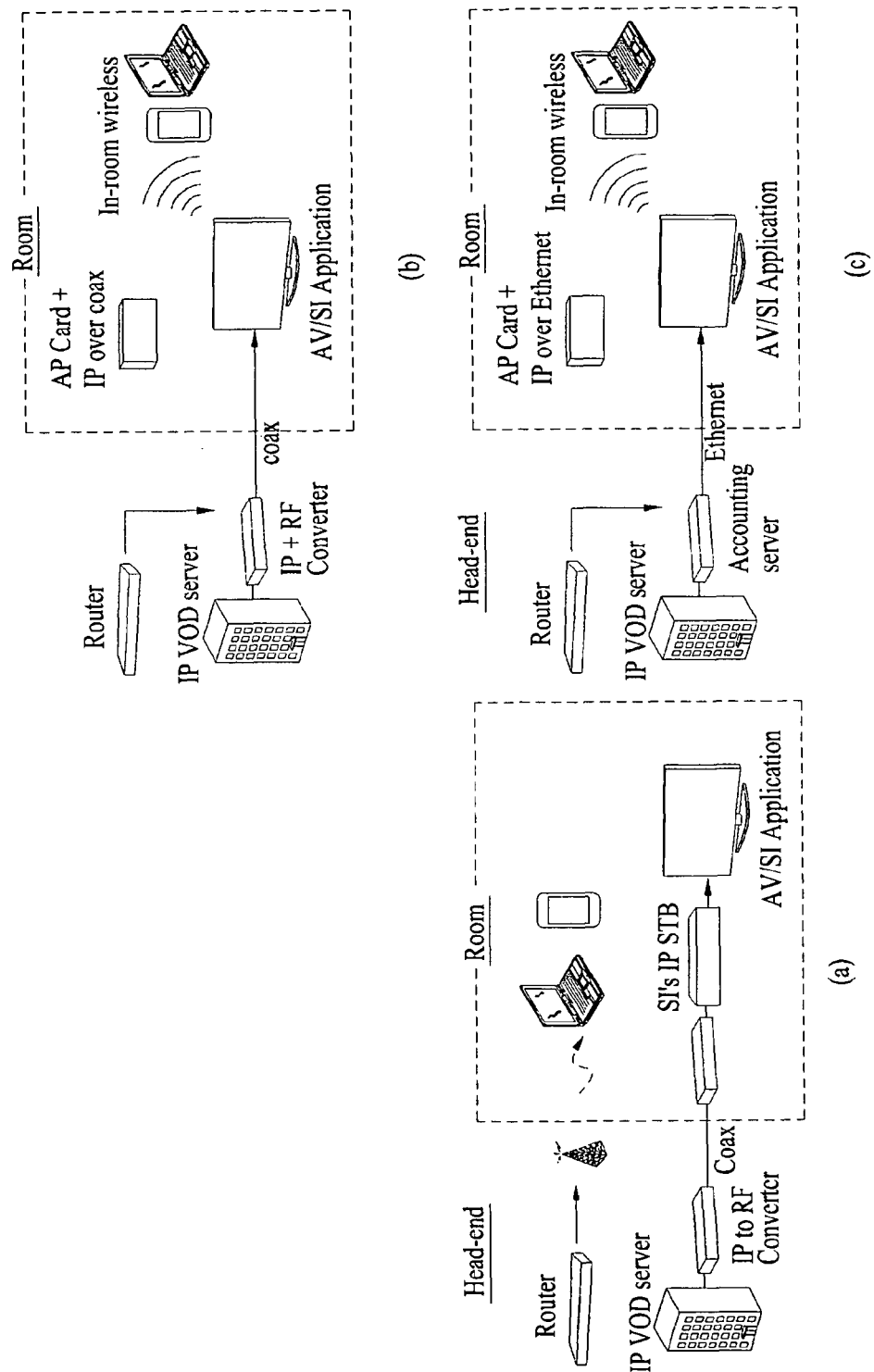
FIG. 3 is a diagram illustrating a multiple access point control system according to a yet another embodiment of the present invention.

FIG. 3 is a diagram illustrating a multiple access point control system according to yet another embodiment of the present invention. FIG. 3(a) illustrates a system capable of being applied to each room according to the related art. FIGS. 3(b) and 3(c) illustrate a multiple access point control system according to yet another embodiment of the present invention.

In the case of most hotels, a cable network is installed in each room as shown in FIG. 3(a). The cable network is connected to a set-top box of each room, or provides a VOD service to each room through a VOD server of the hotel.

For example, if the VOD server transmits an IP packet having video content, the IP-to-RF converter converts the IP packet into an RF signal, and transmits the RF signal to the cable network.

In addition, the set-top box or TV of each room receives the RF signal from the VOD server, and displays video content.

Referring to FIG. 3(a), if the user of each room desires to use the Internet or a wireless phone using a notebook computer based on wireless communication, it is necessary for each room to include a router connected to the Ethernet network or a wireless communication relay module. However, presently, most hotels include only a cable network and do not include a local area network (LAN) or a wireless communication network, such that high costs are needed to additionally install communication lines.

Recently, some hotels have installed one or two wireless communication relay models in each floor so as to provide a wireless communication service. However, the user of each room may not often acquire a service of a desired bandwidth. As a result, high costs are needed to install an additional wireless communication relay module in all rooms.

FIGS. 3(b) and 3(c) illustrate a service capable of being provided through a multiple access point control system according to yet another embodiment of the present invention. A cable network or an Ethernet network is installed in each room of the hotel, and the access point card is installed in a TV of each room. The server of the multiple access point control system is connected to the IP-to-RF converter and the router.

However, the embodiment of the present invention may be applied to one case in which the hotel environment includes the Coax network and another case in which the hotel environment includes the Ethernet network. If the hotel environment includes the Ethernet network, the hotel server additionally includes the accounting server to charge a usage fee on the VOD viewed by a user who lodges in the hotel.

In addition, from the viewpoint of a protocol layer, if the hotel environment includes the Coax network, Digital Storage Media Command and Control (DSM-CC) is converted into data based on an IP packet, and the IP-packet data is transferred using a cable modem protocol. On the other hand, if the hotel environment includes the Ethernet network, the DSM-CC is transferred as the IP packet.

In the meantime, the access point card may serve as a wireless communication module that transmits radio waves to a notebook computer or wireless phone of a user of each room. The notebook computer or wireless phone used by the user may communicate with an external server through the AP card, the cable network or the router.

The server of the multiple access point control system may provide video content or the like to the user of each room or provide a variety of services suitable for the user to the user of each room.

If the AP card is inserted into the television, the AP card may include middleware to drive a variety of applications provided to the user. In addition, the AP can support the multi-protocol interface, such that it may be used as an access point of the AP wireless communication or may control devices of respective rooms.

The IP-to-RF converter transmits the IP packet over a cable network, and the AP card includes the RF-to-IP converter such that it can provide an Internet-based communication service and a multimedia broadcast service to the user. The AP card includes general-purpose middleware standardized for the application provided to the user. Therefore, the service provided by the hotel administrator can be displayed on the TV regardless of TV functions. The AP card, that enables respective hotels to use different content protection functions so as to charge a usage fee for content, includes an operating system that enables various content protection modules to be implemented with software. Therefore, although respective hotels use different content protection functions, content can be transferred to the user through the same AP card, and a detailed description thereof will hereinafter be described in detail.

In the case of a hotel, a user may request a call service for a specific time from the hotel administrator. In the case of using the multiple access point control system, a reserved message may be transferred to the user through the television.

The AP card may communicate with other devices of each room, and drive the application supported by the multiple protocol interface, such that the user of the room may also control devices of the room through the TV.

The television including the AP card may provide a user interface for enabling the user to control devices of the room. For example, the television including the AP card may display various devices capable of being controlled in each room. The television may display a corresponding room and the positions of devices installed in the corresponding room.

For example, if the AP card communicates with the curtain control device, the user can freely open or close a curtain through the user interface displayed on the TV.

In addition, when adjusting an air-conditioner or a hygrometer, the user does not directly adjust a corresponding device, and can remotely operate the user interface displayed on the TV including the AP card.

Figure 4:
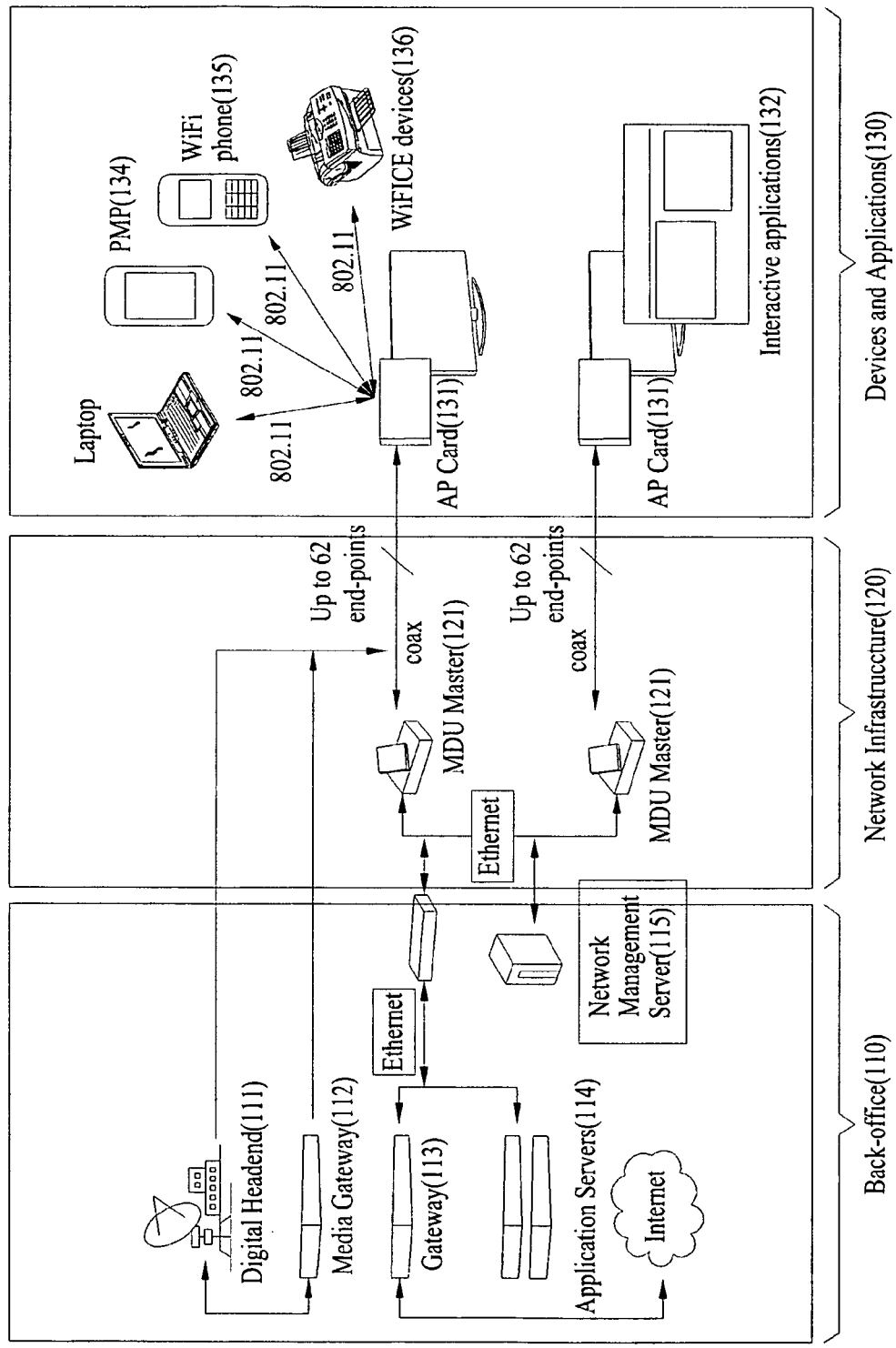
FIG. 4 is a diagram illustrating an access point and a multiple access point control system according to one embodiment of the present invention.

FIG. 4 is a diagram illustrating an access point and a multiple access point control system according to one embodiment of the present invention.

Referring to FIG. 4, the entire system according to one embodiment of the present invention includes a back-office 110, a network infrastructure 120, devices and applications 130, etc. The network management server 115 shown in FIG. 4 carries out functions of the multiple access point control system, and the AP card 131 carries out functions of the multiple access point.

For example, the back-office 110 includes a digital head-end 111, a media gateway 112, a gateway 113, application servers 114, a network management server 115, etc. The back-office 110 may be used to transmit broadcast data and IP data. For example, the back-office 110 may be a broadcast station or the like.

The network infrastructure 120 may include, for example, a Master Data Unit (MDU), etc. For example, the devices and applications 130 includes an Access Point (AP) card 131, interactive applications (for example, DTV) 132, a laptop 133, a Portable Multimedia Player (PMP) 134, a WiFi phone 135, WiFi CE devices 136, etc.

Specifically, the network management server 115 may be managed by the hotel or the service provider. The network management server 115 controls the MDU 121, such that it provides various data to the AP card 131 mounted to the DTV 132 of each room of the hotel.

The AP card 131 may transmit and receive data that is associated with VoIP, VOD, 2-way communication, personal area network, etc., and may process such data.

As shown in FIG. 4, the DTV 132 including the AP card 131 may share such data with peripheral devices (e.g., 133, 134, 135, 136, etc. of FIG. 4) of the DTV.

In addition, although it is assumed that the MDU 121 is connected to the AP card through a coaxial cable as shown in FIG. 4, the scope and spirit of the present invention are not limited thereto, and the embodiment of the present invention may also include another case wherein the network management server 115 is connected to the AP card 131 over the Ethernet.

Figure 5:
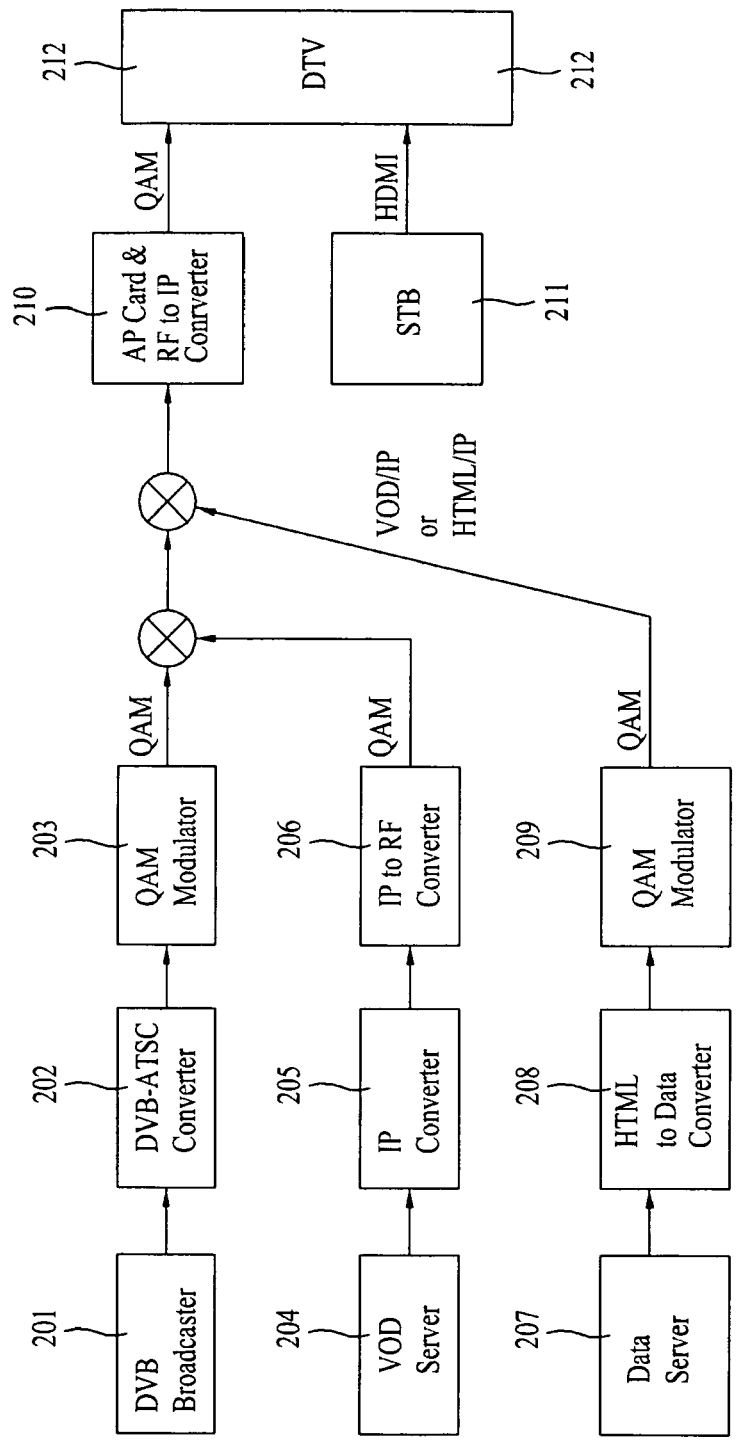
FIG. 5 is a diagram illustrating an access point and a multiple access point control system according to another embodiment of the present invention.

FIG. 5 is a diagram illustrating an access point and a multiple access point control system according to another embodiment of the present invention. FIG. 5 is a detailed block diagram of the entire system, differently from FIG. 4.

Referring to FIG. 5, the Digital Video Broadcasting (DVB) broadcaster 201 transmits a DVB signal, the DVB to ATSC Converter 202 converts the DVB signal into an ATSC signal, and the QAM modulator 203 modulates the converted ATSC signal into a QAM signal.

The VOD server 204 transmits a VOD signal, the IP converter 205 converts the VOD signal into the IP signal, and the IP to RF converter 206 converts the IP signal into the RF signal.

The Data Server 207 transmits an HTML signal, the HTML to Data converter 208 converts the HTML signal into data, and the QAM modulator 209 modulates the converted data into a QAM signal.

An AP CARD & RF to IP converter 210 receives the QAM signals from the QAM modulators 203 and 209 and the IP to RF converter 206.

The AP CARD & RF to IP converter 210 may directly transmit the QAM signal to the DTV 212. If necessary, the AP CARD & RF to IP converter 210 may convert the QAM signal into the IP signal, and transmit the IP signal to the set-top box (STB) 211.

In addition, the DTV 212 may process the QAM signal received from the AP CARD & RF to IP converter 210, and the processed signal may be displayed according to various display schemes, for example, LCD, PDP, ELD, VFD, etc.

The STB 211 may be connected to the DTV through a cable, for example, an HDMI, DVI, or D-sub cable.

The STB 211 may be connected to the DTV 212 over a wireless network, such as Zigbee, Bluetooth, or Wlan, etc.

Meanwhile, the DVB broadcaster 201, the VOD server 204, and the Data Server 207 may be managed by a broadcast station, a Content Provider (CP), a Service Provider (SP), etc. For example, the DVB to ATSC Converter 202, the IP Converter 205, the HTML to Data Converter 208, the QAM Modulator 203, the IP to RF Converter 206, and the QAM Modulator 209 may be managed by a hotel, a hospital, etc. For example, the AP card & RF to IP Converter 210, the STB 211, or the DTV 212 may represent a digital broadcast receiver.

Therefore, in the case of using the system shown in FIG. 5, a hotel not providing Internet services can easily provide Internet services (e.g., Internet services received from the VOD server or the Data Server) to guests of each room of the hotel.

Figure 6:
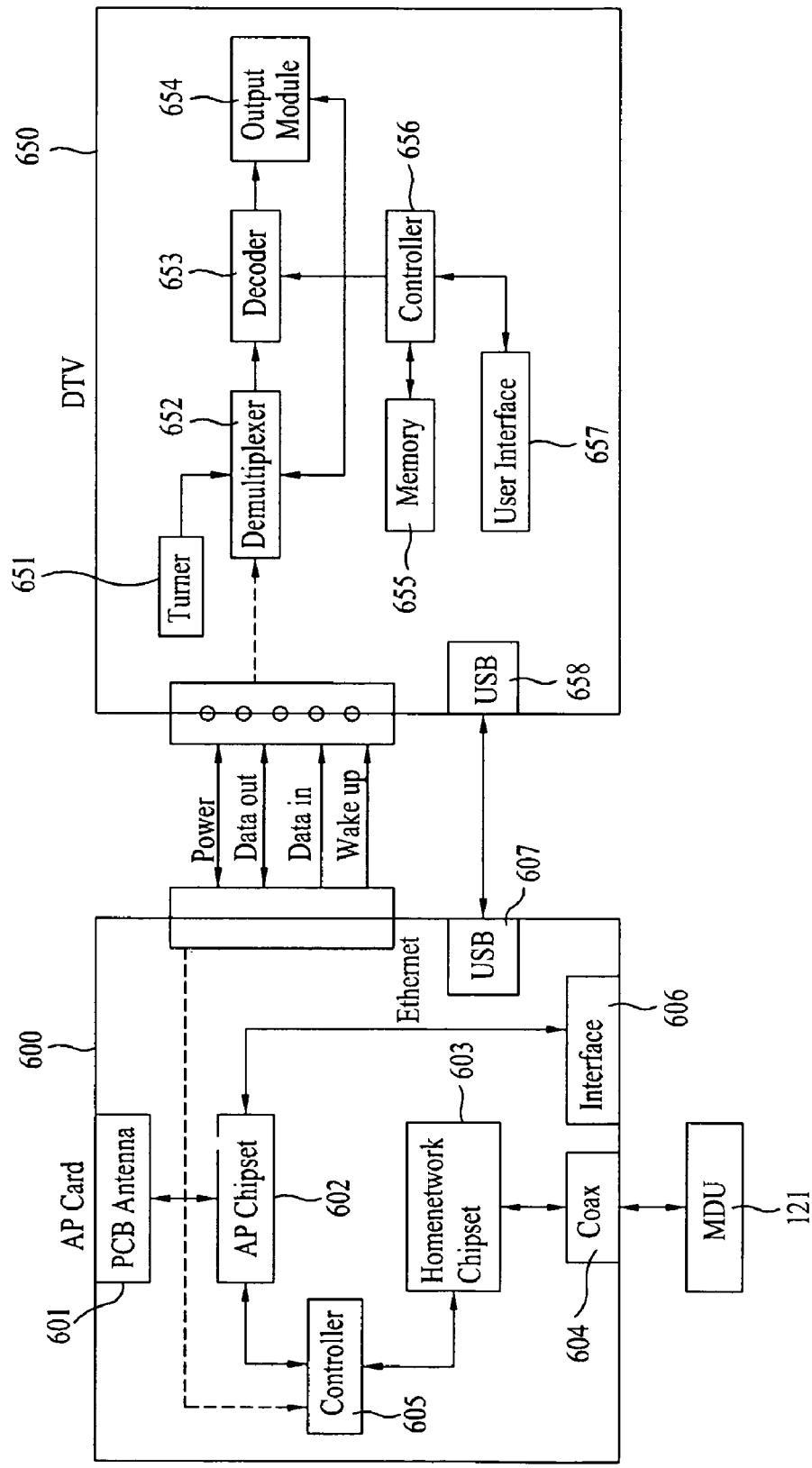
FIG. 6 is a block diagram illustrating an AP card and a DTV according to one embodiment of the present invention.

FIG. 6 is a block diagram illustrating an AP card and a DTV according to one embodiment of the present invention. FIG. 6 illustrates an exemplary case in which there is no DTV Ethernet in each room of the hotel. For example, the AP card shown in FIG. 6 may serve as the above-mentioned multiple access point.

Referring to FIG. 6, the AP card 600 includes a variety of modules, for example, a PCB antenna 601, an AP chipset 602, a homenetwork chipset 603, a Coax module 604, an interface 606, a controller 605, a USB 607, etc. As shown in FIG. 6, the DTV 650 includes a variety of modules, for example, a controller 656, a tuner 651, a demultiplexer 652, a decoder 653, an output module 654, a memory 655, a user interface 657, a USB 658, etc. However, for better understanding of the present invention, the MDU 121 shown in FIG. 6 may also correspond to the MDU shown in FIG. 4 as necessary.

The AP card 600 may be connected to the MDU 121 through the coax line. The controller 605 may copy packets between the AP chipset 602 and the homenetwork chipset 603. Further, the controller 605 controls the AP chipset 602 and the homenetwork chipset 603. For example, the homenetwork chipset 603 may be a Multimedia over Coax Alliance (MoCA) chipset or a Home Phoneline Networking Alliance (HPNA) chipset, etc.

The AP chipset 602 may control communication with a plurality of devices contained in each room including the DTV 650. In more detail, the AP chipset 602 may provide a wireless Internet service such as WiFi to the devices.

The homenetwork chipset 603 may convert the RF signal into IP data through a cable network (coax) 604. If it is necessary to transmit the IP data to a wireless communication device of each room, the homenetwork chipset 603 may transmit the IP data to the AP chipset 602. The homenetwork chipset 603 may convert the IP data received from the AP chipset 602 into an RF signal, and transmit the RF signal to the coax module 604. The PCB antenna 601 may be a module that enables several devices of each room including the DTV 650 to wirelessly communicate with the AP chipset 602.

In the meantime, the tuner 650 receives the RF broadcast signal. The USB 607 of the AP card 600 may transmit and receive data to and from the USB 658 of the DTV 650, for example, large amounts of data for firmware or data for setting a Service Set Identifier (SSID) may be communicated between the USB 607 and the other USB 658.

The AP card 600 transmits and receives a VoIP signal through, for example, the AP chipset 602, transmits a VOD signal to the DTV 650 through the USB 607, and provides information (e.g., GEM application data, etc.) associated with data broadcast content of the hotel through the USB 607. The controller 656 of the DTV 650 controls a tuner 651, a demultiplexer 652, a memory 655, a user interface 657, etc. The demultiplexer 652 may demultiplex a video signal, an audio signal, and data received from either the AP card 600 or the tuner 651.

The decoder 653 may decode the demultiplexed video and audios signals and the demultiplexed data. The output module 654 may output the decoded video and audio signals and the decoded data.

Further, the memory 655 may store some or all information received from the AP card 600. The user interface 657 may transmit a user-entry command signal to the controller 656.

Figure 7:
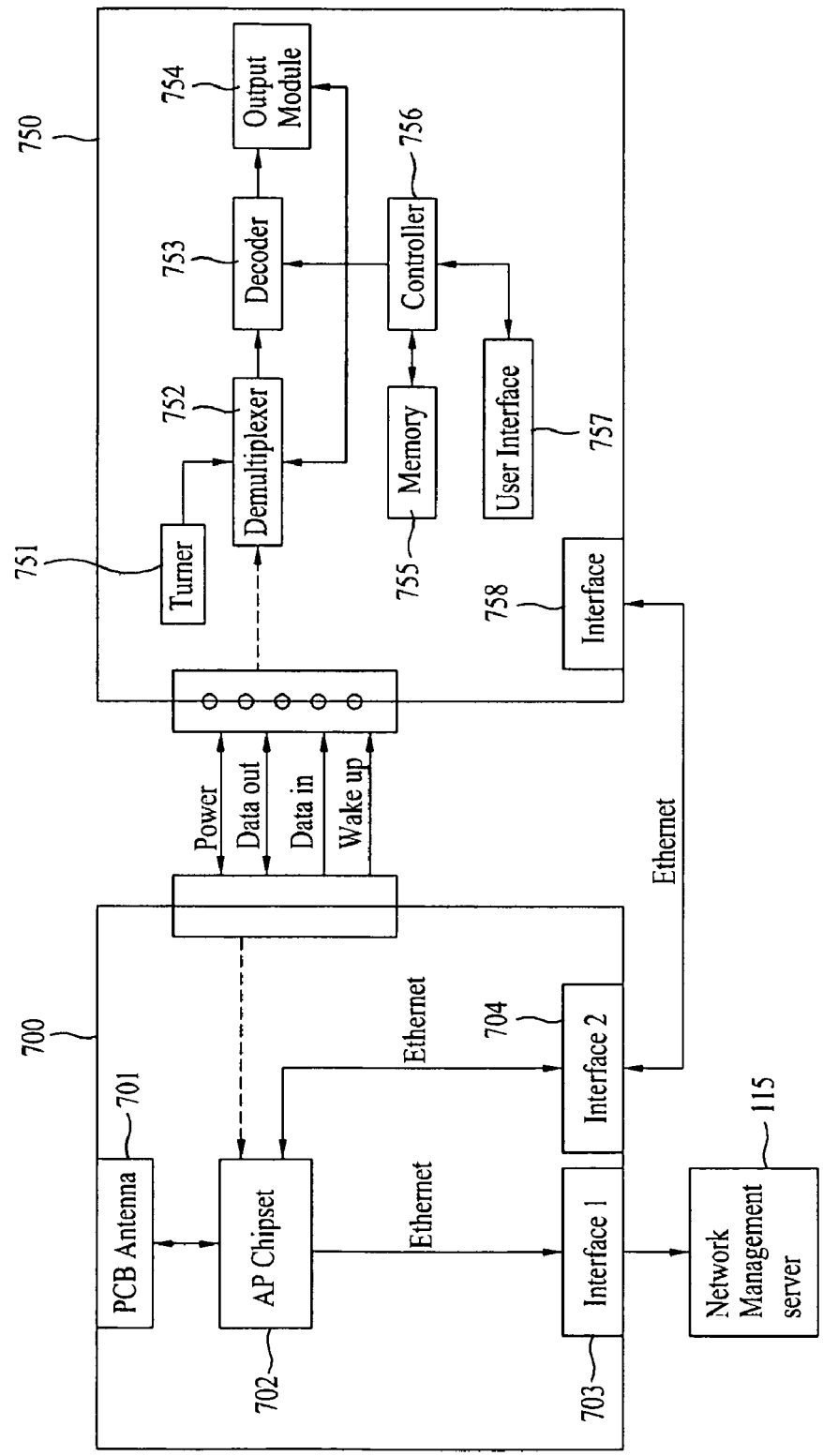
FIG. 7 is a block diagram illustrating an AP card and a DTV according to another embodiment of the present invention.

FIG. 7 is a block diagram illustrating an AP card and a DTV according to another embodiment of the present invention. FIG. 7 illustrates an exemplary case that the DTV contained in each room of the hotel includes the Ethernet connection. The main concept of FIG. 7 may also be understood by referring to FIG. 6 as necessary. For example, the AP card shown in FIG. 7 may serve as the access point.

Referring to FIG. 7, the AP card 700 includes a plurality of modules, for example, a PCB antenna 701, an AP chipset 702, a first interface (Interface 1) 703, a second interface (Interface 2) 704, etc. For example, the DTV 750 includes a plurality of modules, for example, a controller 756, a tuner 751, a demultiplexer 752, a decoder 753, an output module 754, a memory 755, a user interface 757, an interface 758, etc. However, for better understanding of the present invention, the network management server 115 shown in FIG. 7 may also correspond to the network management server shown in FIG. 4.

Differently from FIG. 6, the AP card 700 shown in FIG. 7 receives the Ethernet signal from the network management server 115, and the AP chipset 702 may communicate with several devices contained in each room having the DTV 750.

In more detail, the AP chipset 702 may provide an Internet service such as WiFi to several devices. The PCB antenna 701 may be a module that enables several devices of each room including the DTV 650 to wirelessly communicate with the AP chipset 602.

Further, the first interface (Interface 1) 703 is a module for transmitting and receiving an Ethernet signal to and from the network management server 115. The second interface (Interface 2) 704 is a module for transmitting and receiving an Ethernet signal to and from the interface 758 contained in the DTV 750.

In addition, the controller 756 of the DTV 750 controls a demultiplexer 752, a decoder 753, an output module 754, a memory 755, a user interface 757, etc. The demultiplexer 752 may demultiplex a video signal, an audio signal, and data received from the AP card 700.

The decoder 753 may decode the demultiplexed video and audios signals and the demultiplexed data. The output module 754 may output the decoded video and audio signals and the decoded data.

Further, the memory 755 may store some or all information received from the AP card 700. The user interface 757 may transmit a user-entry command signal to the controller 756.

Figure 8:
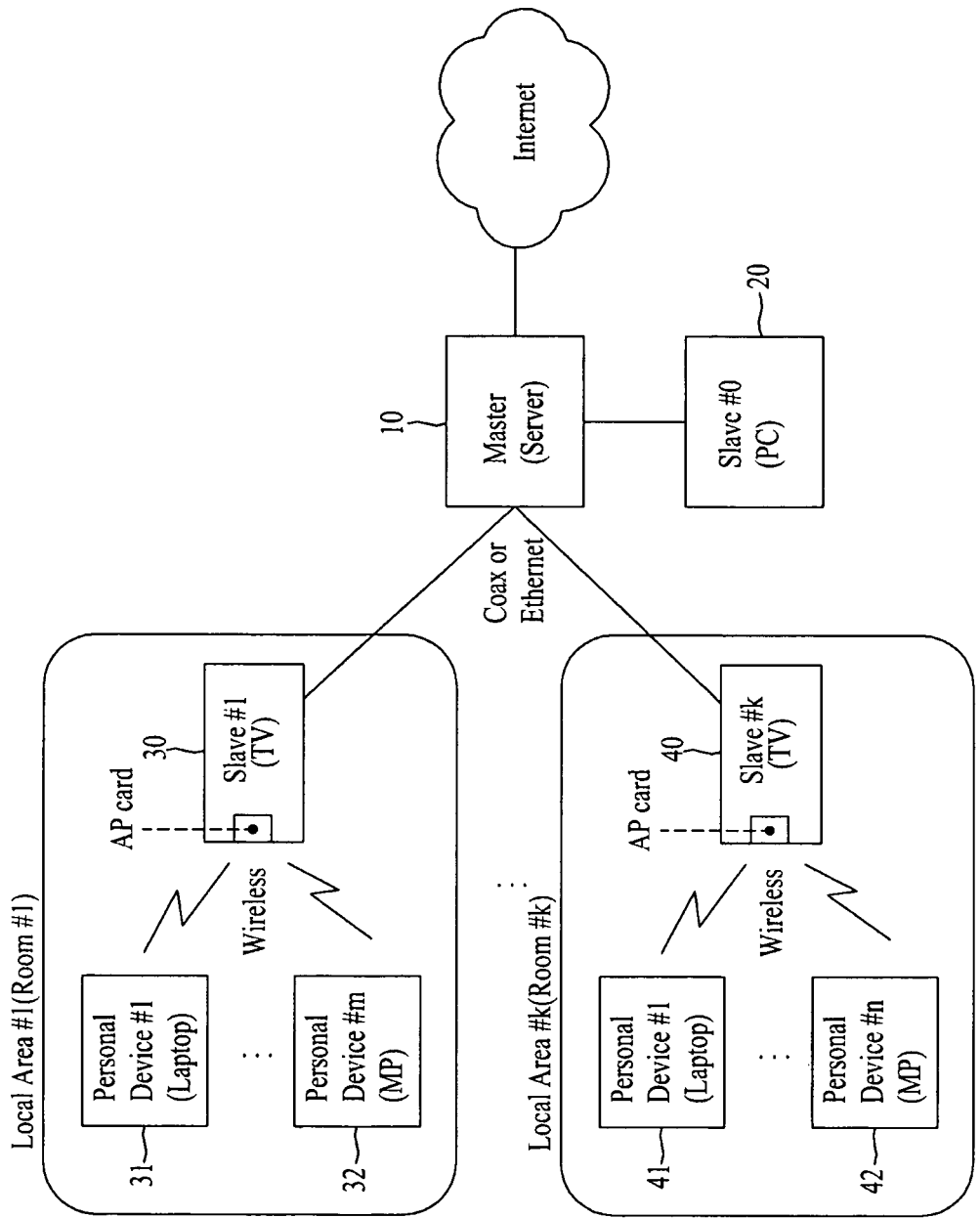
FIG. 8 is a block diagram illustrating a system for providing an Internet service to each room of a hotel according to one embodiment of the present invention.

FIG. 8 is a block diagram illustrating a system for providing an Internet service to each room of a hotel according to one embodiment of the present invention.

Referring to FIG. 8, the master 10 may perform a function of the above-mentioned multiple access point control system. The AP card may perform, for example, a function of the multiple access point.

First of all, the embodiment of the present invention discloses a system for providing an Internet service installed in a specific place such as a hotel having one or more rooms. Referring to FIG. 8, the above-mentioned system includes the master connected to the Internet, local slaves 30 and 40, and a management slave 20. The master 10 is connected to the Internet. The local slaves 30 and 40 are connected to the master 10 by wire, and are wirelessly connected to personal devices 31, 32, 41, and 42 of specific local areas #1 to #K. The management slave 20 may be connected to the local slaves 30 and 40 through the master 10.

In the meantime, the master 10 may be, for example, a hotel server or a headend. The management slave 20 is, for example, a personal computer (PC) installed in a hotel reception area or front desk. The local slave 30 or 40 may be, for example, a TV installed in each hotel room.

In addition, as can be seen from FIG. 8, the local slaves 30 and 40 may include a wired/wireless communication unit for communicating with the PCs 31, 32, 41, and 42 (e.g., a laptop computer and a mobile phone) used by the user who is located at a corresponding local area, and may further include another wired/wireless communication unit for communicating with the master 10.

For example, the wireless communication unit may be a WiFi PAN access point module. For example, the wired communication unit may be a MoCA/HPNA module. Meanwhile, the WiFi PAN access point module is manufactured in the form of a wireless communication chip that can perform wireless communication through the Personal Area Network (PAN) according to the WiFi technology for supporting various wireless network standards (e.g., 802.11, 802.11a, 802.11b, and 802.11g protocols).

In addition, the MoCA/HPNA module is manufactured in the form of a chip using a telephone line, a power line, or a coaxial cable (Coax). In this case, the Multimedia over Coax Alliance (MoCA) technology and the Home Phoneline Networking Alliance (HPNA) technology may be applied to the manufactured chip, such that the chip can communicate with the master 10 by wire.

Figure 9:
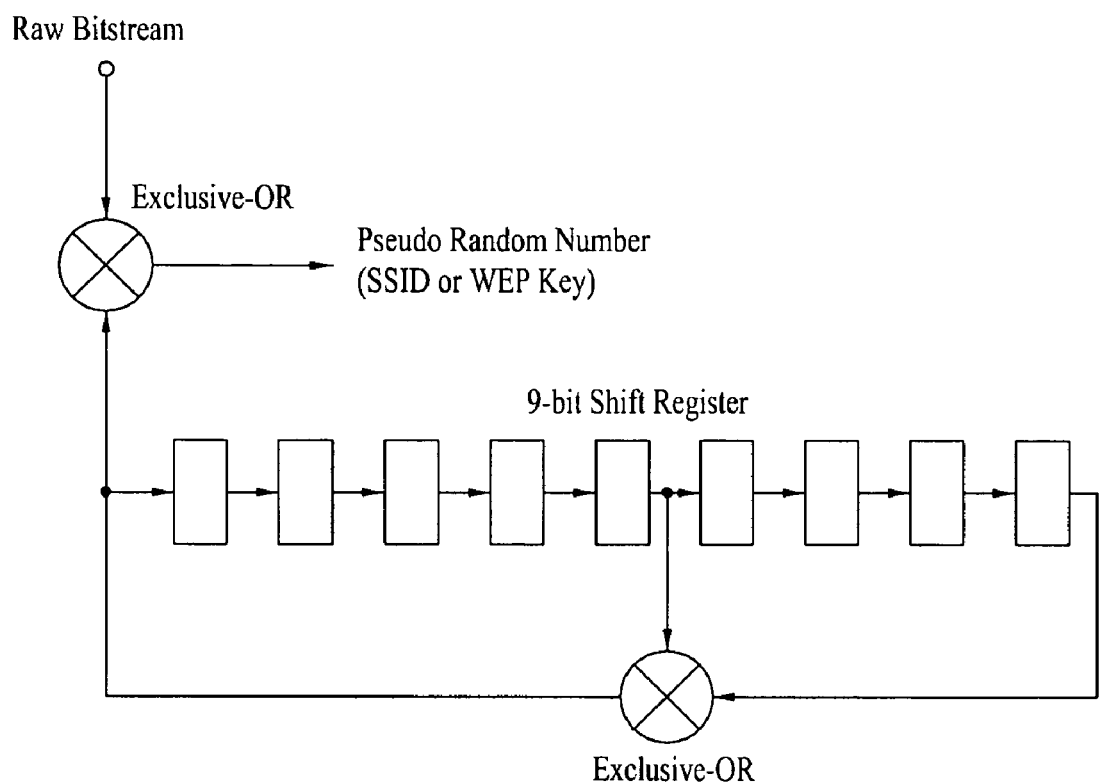
FIG. 9 is a diagram illustrating a procedure for generating a unique SSID and WEB key value according to one embodiment of the present invention.

FIG. 9 is a diagram illustrating a procedure for generating a unique SSID and WEB key value according to one embodiment of the present invention.

Referring to FIG. 9, the management slave 20 or the local slaves 30 and 40 shown in FIG. 8 generate Pseudo Random Numbers indicating a unique Service Set Identifier (SSID) and a Wired Equivalent Privacy (WEP) key using two Exclusive-OR gates and a 9-bit shift register.

For example, the SSID is a unique ID N bytes long (e.g., unique ID 32 bytes long) added to each header of packets transmitted over a wireless LAN, and is used like a code or password when connected to wireless terminals. The SSID may discriminate one wireless LAN from other wireless LANs. Therefore, according to one embodiment of the present invention, all access points or wireless terminals, that desire to access a specific wireless LAN, are designed to use the same unique SSID.

The WEP encrypts data, that is communicated between an adaptor and an access point connected to the wireless LAN, into 64 bits (40+24) or 128 bits (104+24), resulting in increased security. According to one embodiment of the present invention, the WEP key value is used as an encryption key value, and the same WEP key value is assigned to a plurality of communication terminals.

In the meantime, the SSID is configured in the form of a predetermined unique value that is a combination of a unique number (e.g., a hotel room number 501) assigned to a specific local area and a name (e.g., KIM) of a user who uses the specific local area. The WEP key is configured in the form of a predetermined unique value that is a combination of a name (e.g., KIM) of a user who uses the specific local area and a card number (e.g., 4518-XXXX-XXXX-XXXX).

The local slave 30 transmits the SSID to personal devices 31 and 32 contained in the corresponding local area (LOCAL AREA #1), and displays the WEP key value on the screen. The user may establish the SSID and the key value in each personal device. Therefore, the personal device in which the SSID and the WEP key value are established may receive Internet service through the local slave and the master, and a detailed description thereof will hereinafter be described with reference to FIGS. 10 to 12.

Figure 10:
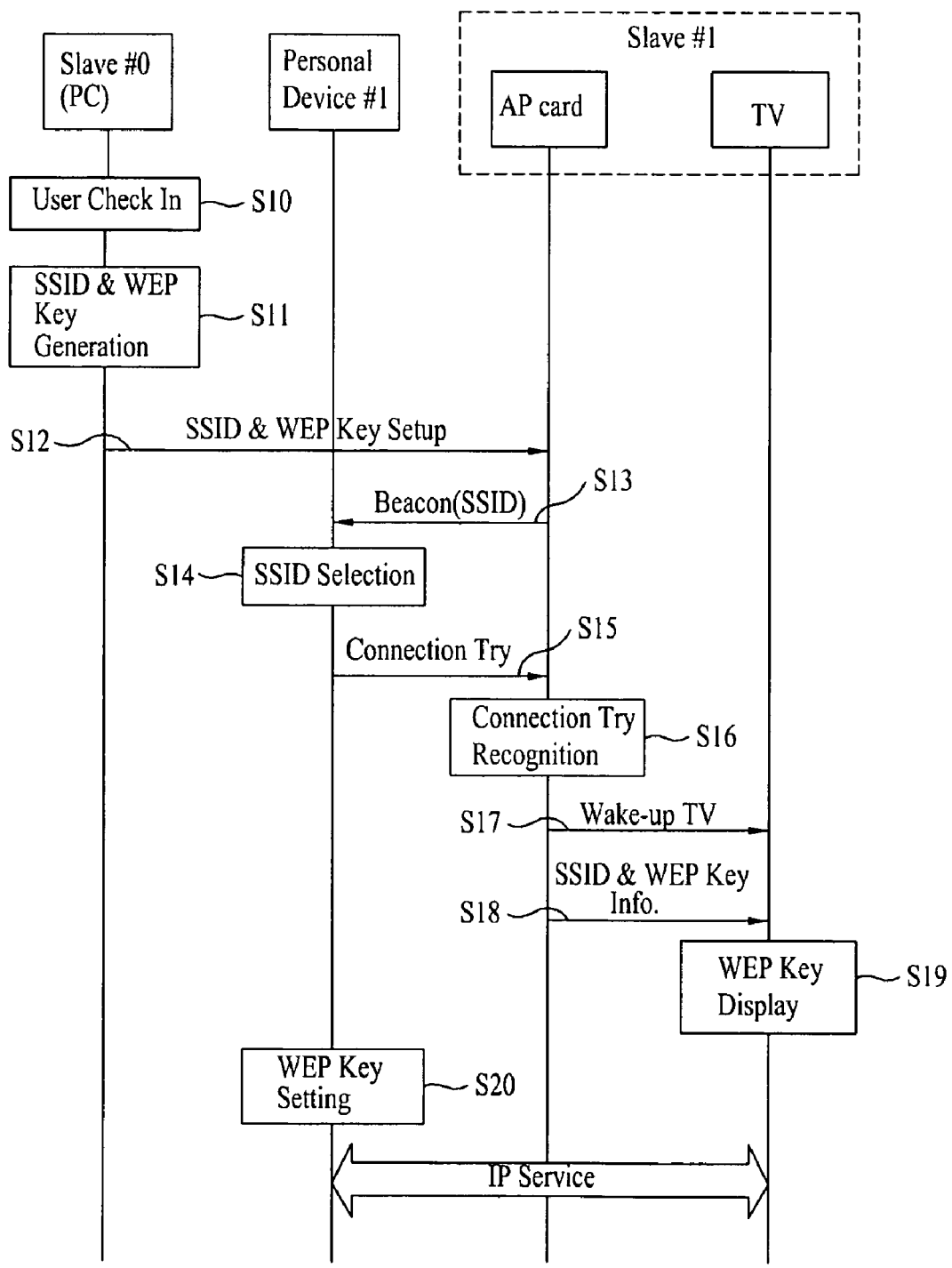
FIG. 10 is a flowchart illustrating a method for providing an Internet service according to a first embodiment of the present invention.

FIG. 10 is a flowchart illustrating a method for providing an Internet service according to a first embodiment of the present invention.

Referring to FIG. 10, if a user who desires to lodge in a hotel checks in to the hotel at step S10, a management slave (Slave #0) indicating a personal computer (PC) located at the front desk of the hotel combines a unique number of a hotel room in which the user will stay with name of the user, and generates a unique SSID and a WEP key value at step S11.

The Slave #0 establishes the SSID and the WEP key value in a local slave (Slave #1) connected to the Slave #0 through the master 10 at step S12. For example, the Slave #1 transmits the SSID to the Personal Device #1 using a beacon signal at step S13.

If the personal device #1 selects the SSID at step S14, the user may attempt to access the Internet service. In this case, the personal device #1 transmits a connection try command signal to the AP card at step S15. If the AP card recognizes an Internet service access attempt signal on the basis of the connection try command signal at step S16, the AP card wakes the DTV contained in the Slave #1 at step S17.

The AP card may transmit the SSID and the WEP key value to the DTV at step S18, and the DTV may display the WEP key value on the screen at step S19. The user enters the displayed WEP key value in the personal device #1 so as to perform a series of WEP key setup operations at step S20. Thereafter, the user requests the Internet service, such that the personal device #1 can receive the Internet service and the like through the local slave (Slave #1) and the master using the established Internet SSID and WEP key value.

Figure 11:
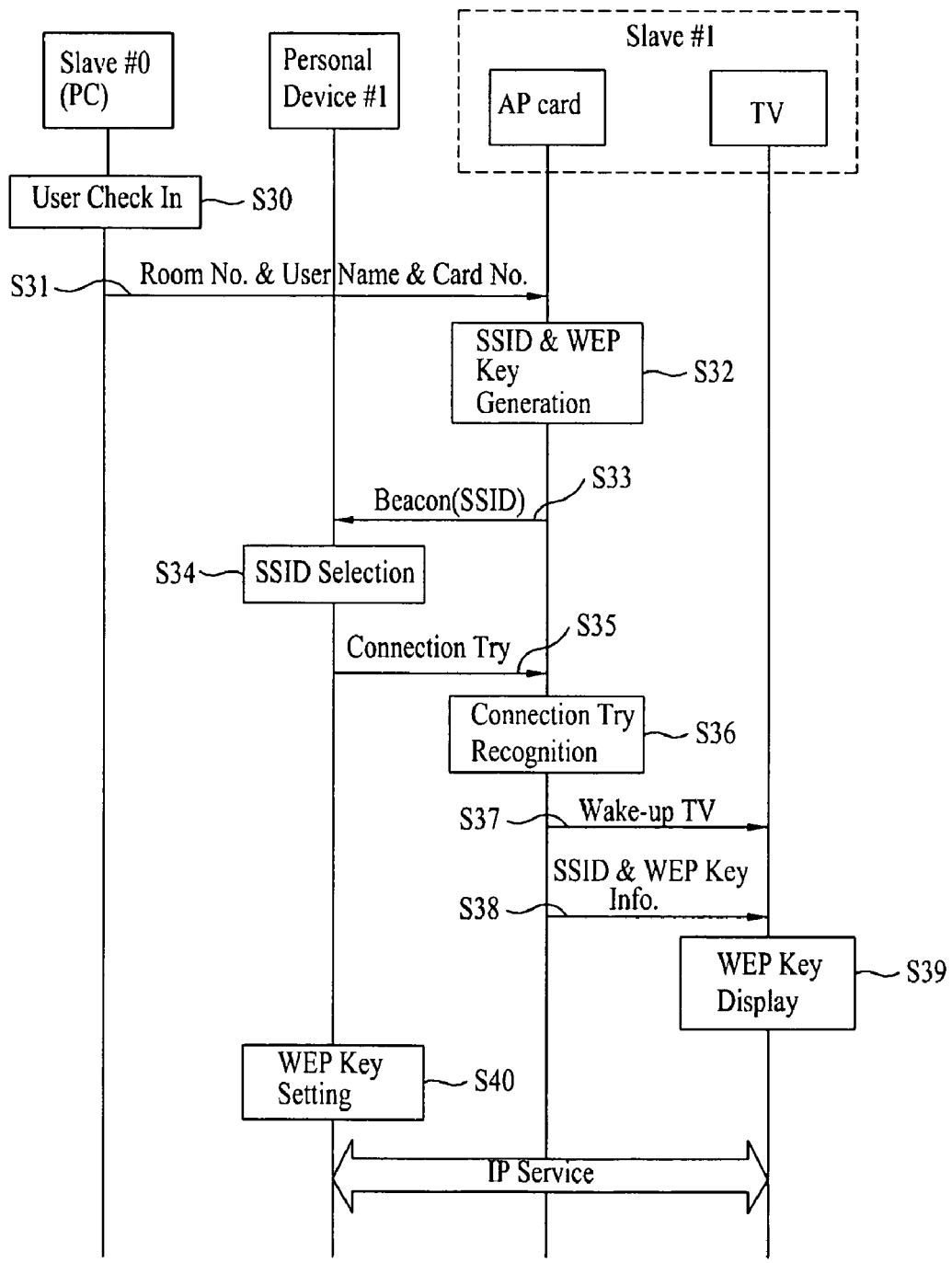
FIG. 11 is a flowchart illustrating a method for providing an Internet service according to a second embodiment of the present invention.

FIG. 11 is a flowchart illustrating a method for providing an Internet service according to a second embodiment of the present invention.

For example, if a user who desires to lodge in a hotel checks in to the hotel at step S30, a management slave (Slave #0) indicating a personal computer (PC) located at the front desk of the hotel may transmit a unique number of a hotel room in which the user will stay, the user's name, the user's resident registration number, or the card number to the AP card of the Slave #1 connected to the Slave #0 through the master 10 at step S31.

In the meantime, the AP card combines the unique number of the hotel room and the user's name, such that it generates a predetermined unique SSID using the combined result. The AP card combines the user's resident registration number and/or the card number, such that it generates a predetermined unique WEP key value at step S32.

The AP card may wirelessly transmit the SSID to the personal device #1 using a beacon signal at step S33.

If the personal device #1 selects the SSID at step S34, the user may attempt to access the Internet service. In this case, the personal device transmits a connection try command signal to the AP card at step S35. If the AP card recognizes an Internet service access attempt signal on the basis of the connection try command signal at step S36, the AP card wakes the DTV contained in the Slave #1 at step S37.

The AP card may transmit the SSID and the WEP key value to the DTV at step S38, and the DTV may display the WEP key value on the screen at step S39.

The user enters the displayed WEP key value in the personal device #1 so as to perform a series of WEP key setup operations at step S40. Thereafter, the user requests the Internet service, such that the personal device #1 can receive the Internet service through the local slave (Slave #1) and the master using the established Internet SSID and WEP key value.

Figure 12:
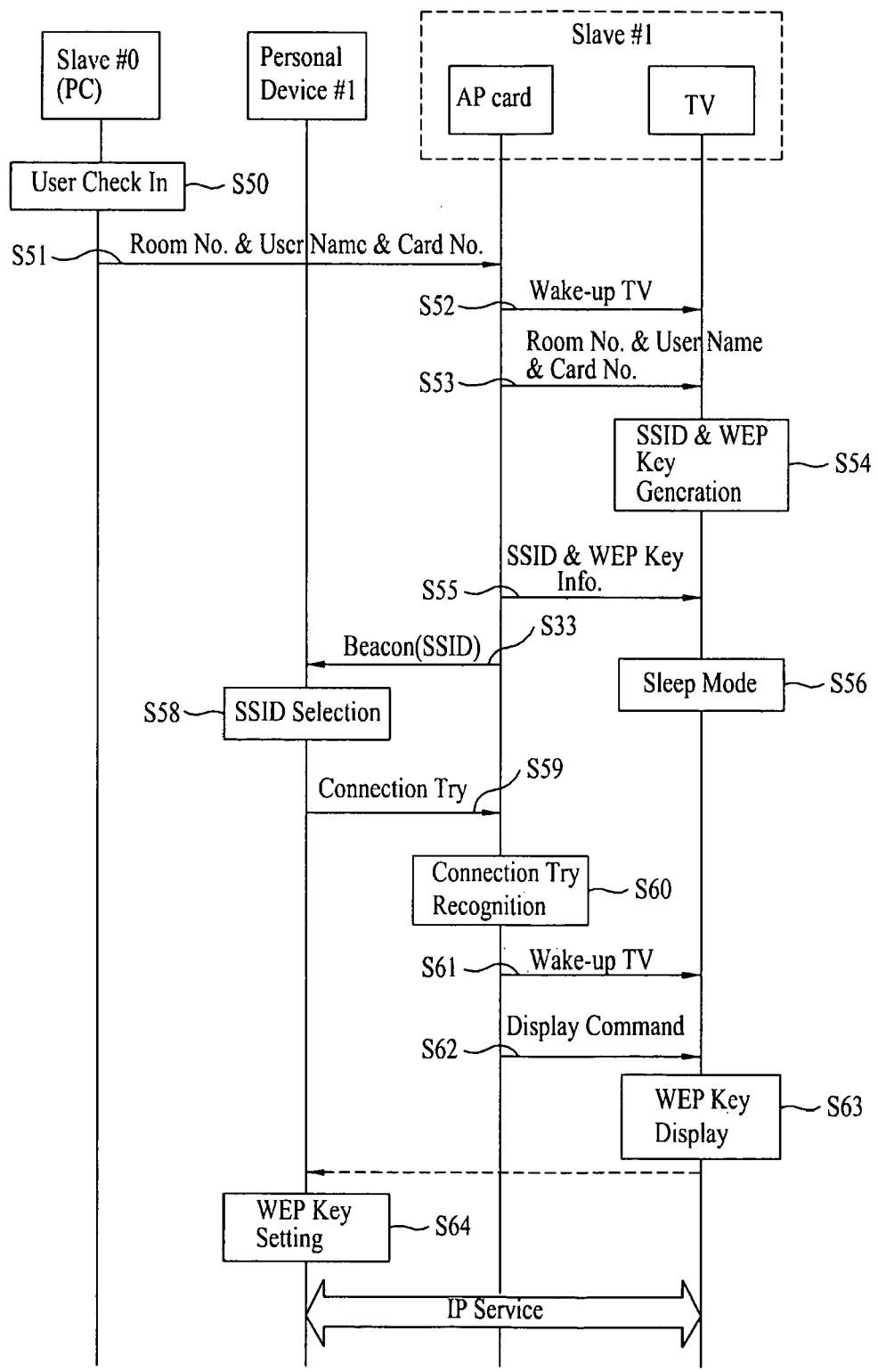
FIG. 12 is a flowchart illustrating a method for providing an Internet service according to a third embodiment of the present invention.

FIG. 12 is a flowchart illustrating a method for providing an Internet service according to a third embodiment of the present invention.

For example, if a user who desires to lodge in a hotel checks in to the hotel at step S50, a management slave (Slave #0) indicating a PC located at the front desk of the hotel may transmit a unique number of a hotel room in which the user will stay, the user's name, the user's resident registration number, or the card number to the AP card of the Slave #1 being connected to the Slave #0 through the master 10 at step S51.

The AP card may wake the DTV of the local slave (Slave #1) at step S52, and transmit a unique number of the hotel room, a user name, and a user's resident registration number or a card number to the DTV at step S53.

The DTV combines the unique number of the hotel room and the user's name such that it generates a predetermined unique SSID. In addition, the DTV combines the user's name, the user's resident registration number, and/or the card number, such that it generates a predetermined unique WEP key value at step S54.

The DTV transmits the SSID and the WEP key value to the AP card at step S55. The DTV automatically enters a power saving mode, i.e., a sleep mode at step S56. The AP card wirelessly transmits the SSID to the personal device #1 using a beacon signal at step S57.

If the personal device #1 selects the SSID at step S58, the user may attempt to access the Internet service. In this case, the personal device #1 transmits a connection try command signal to the AP card at step S59. If the AP card recognizes an Internet service access attempt signal on the basis of the connection try command signal at step S60, the AP card wakes the DTV contained in the Slave #1 at step S61.

The AP card may transmit a command signal that asks the DTV to display the WEP key value to the DTV at step S62, and the DTV may display the WEP key value on the screen at step S63

The user enters the displayed WEP key value in the personal device #1 so as to perform a series of WEP key setup operations at step S64. Thereafter, the user requests the Internet service, such that the personal device #1 can receive the Internet service and the like through the local slave (Slave #1) and the master using the established Internet SSID and WEP key value.

Figure 13:
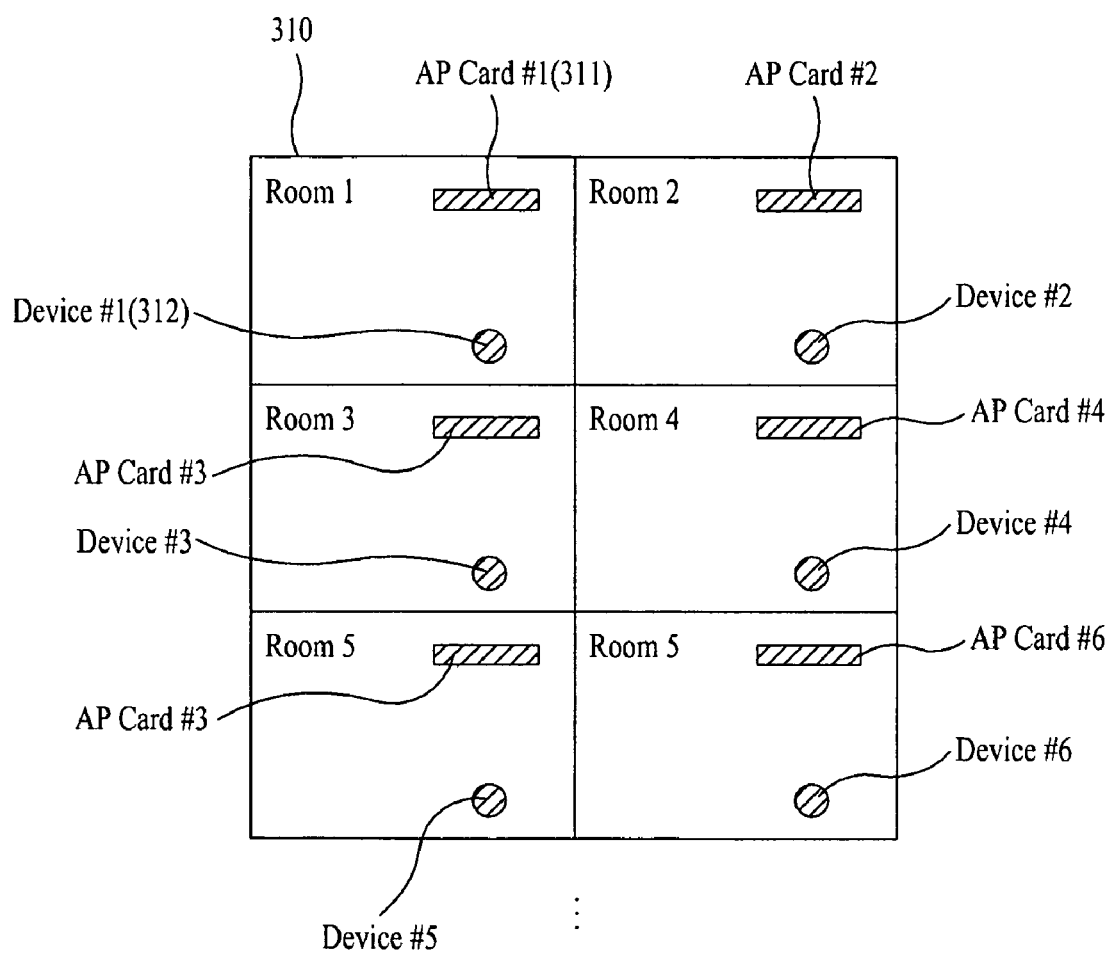
FIG. 13 shows an installation example of AP cards and devices that are located in respective rooms of a limited space such as a hotel or hospital according to one embodiment of the present invention.

FIG. 13 shows an installation example of AP cards and devices that are located in respective rooms of a limited space such as a hotel or hospital according to one embodiment of the present invention.

Referring to FIG. 13, the AP card 311 may be independently located, or may be mounted to the DTV of each room 310.

In the case of using the above-mentioned embodiment, although a first device (Device #1) of a Room 1 is close to an AP Card #3 of a Room 3, it communicates with an AP Card #1 of the Room 1. Similarly, although a second device (Device #2) of a Room 2 is close to the AP Card #4 of the Room 4, it communicates with the AP Card #2 of the Room 2. Therefore, respective AP cards may not communicate with devices of other rooms whereas they communicate with devices of a corresponding physical space. That is, according to one embodiment of the present invention, the user of each room may sufficiently receive a communication service of a given bandwidth, irrespective of an amount of data used for communication with a user of another room.

Further, the network management server may transmit the same or another control signal to AP cards of individual rooms shown in FIG. 13. As a result, the DTV to which the AP card of each room is mounted can display a room interactive service including a variety of services capable of being provided in the hotel, for example, room service, hotel information, a reservation service, a check-out information service, an entertainment service, a game service, etc.

Different room interactive services may be provided to individual rooms. Otherwise, only some rooms of the hotel may receive different room interactive services, or all the rooms of the hotel may receive the same room interactive services.

In the meantime, the device 312 located at each room 310 of the hotel may receive data of a VoIP service, data of a VOD service, or data of an Internet service.

Figure 14:
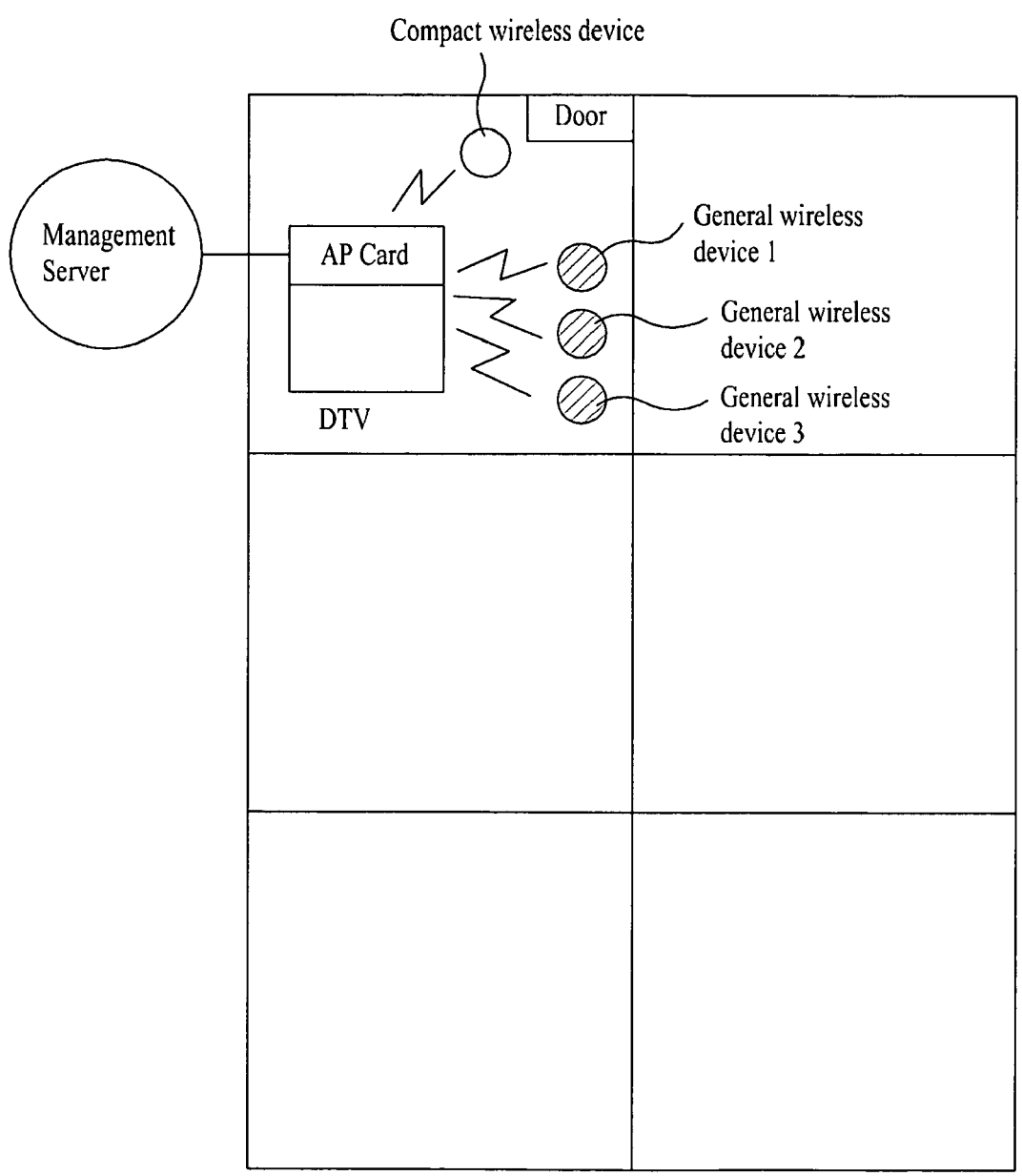
FIG. 14 is a diagram illustrating a multiple access point control system that uses a newly defined compact wireless device according to one embodiment of the present invention.

FIG. 14 is a diagram illustrating a multiple access point control system that uses a newly defined compact wireless device according to one embodiment of the present invention. FIGS. 1 to 13 illustrate various embodiments, each of which does not use the compact wireless device. FIGS. 14 to 23 illustrate various embodiments, each of which uses the compact wireless device. The remaining drawings from FIG. 24 may use or may not use the compact wireless device. Functions of the above-mentioned compact wireless device newly defined in the present invention will hereinafter be described in detail.

Referring to FIG. 14, the DTV according to one embodiment of the present invention includes the AP card so as to provide an Internet service to a guest through a wireless LAN within a limited space such as a hotel. For example, the compact wireless device may pre-store guest information, room information, and information of general wireless devices (e.g., laptop, PDA, WiFi devices, etc.), that desire to receive the Internet service in the room, in a Radio Frequency Identification (RFID) tag or a wireless LAN (WLAN) memory.

First of all, the embodiments of the present invention can provide a limited space such as a hotel with various functions using the compact wireless device, and a detailed description thereof will hereinafter be described.

The compact wireless device according to one embodiment of the present invention communicates with the DTV including the AP card through the DTV and the wireless LAN, and includes an RFID tag or an RFID card. In addition, if any of guests checks in at a hotel, the guest information (e.g., age, sex, number of children, purpose of travel, etc.), room information (e.g., WEP key values of Room No., TV ID, and AP card), and information of a device to be connected to the AP card of the DTV located at the room are recorded or written in the RFID tag contained in the compact wireless device. Further, according to one embodiment of the present invention, the recorded information is also copied in a memory of the compact wireless device through a wireless LAN contained in the compact wireless device.

Therefore, the compact wireless device records the above-mentioned information in the RFID tag, serves as a room key, and thus enables a guest of the hotel to use various facilities of the hotel. Particularly, guest information and room information are recorded in the compact wireless device, such that the compact wireless device can interoperate with a billing system.

Meanwhile, if a guest, who checked in to the hotel and received the compact wireless device having the above-mentioned information from a hotel staff member, enters a corresponding room, the TV including the RFID reader communicates with the above-mentioned compact wireless device, such that a TV ID recorded in the RFID tag of the compact wireless device is recognized. If the recognized TV ID is determined to be an authorized TV ID, the TV mode is automatically changed to a power-on mode, and a message (e.g., Mr. KIM! Welcome to AAA Hotel) customized for the guest is displayed using the guest information recorded in the RFID tag of the compact wireless device.

If the TV has no RFID reader, the compact wireless device is connected to the AP card of the TV through the wireless LAN. The TV recognizes a TV ID recorded in the RFID tag of the compact wireless device in the same manner as described above. If the recognized TV ID is determined to be an authorized TV ID, the TV mode is automatically changed to a power-on mode, and a message (e.g., Mr. KIM! Welcome to AAA Hotel) customized for the guest is displayed using the guest information recorded in the RFID tag of the compact wireless device.

Further, general wireless devices (e.g., WiFi devices) contained in the room in which the guest enters may attempt to connect to the AP card of the TV so as to use the Internet service. In this case, the compact wireless device according to one embodiment of the present invention is operated as an authentication server (e.g., a Remote Authentication Dial-In User Services (RADIUS) server), and authenticates the general wireless devices.

However, the embodiment of the present invention has an advantage in that it can maintain security without carrying out a complicated RADIUS authentication procedure. In other words, the compact wireless device according to one embodiment of the present invention can carry out the authentication procedure by implementing only a minimum number of functions. For example, information of general wireless devices contained in each room of the hotel has already been recorded in the compact wireless device that serves as an authentication server as described above, such that it is not necessary for the compact wireless device to include all parsing stacks (SW stacks) of packets that have received from the AP card so as to transmit RADIUS-Access-Challenge and RADIUS-Access-Accept packets. As a result, the efficiency and speed of data processing can be improved.

In addition, according to one embodiment of the present invention, the compact wireless device may be designed to be customized for each service provided by the service providers (such as the hotel enterprise) who provide tourist attraction information, restaurant information, weather information, event information, transportation information, etc. In other words, the guest can monitor the above-mentioned information through the use of a TV, or the above-mentioned information can be transmitted to the specialized application contained in the compact wireless device through the wireless LAN, and then stored.

Figure 15:
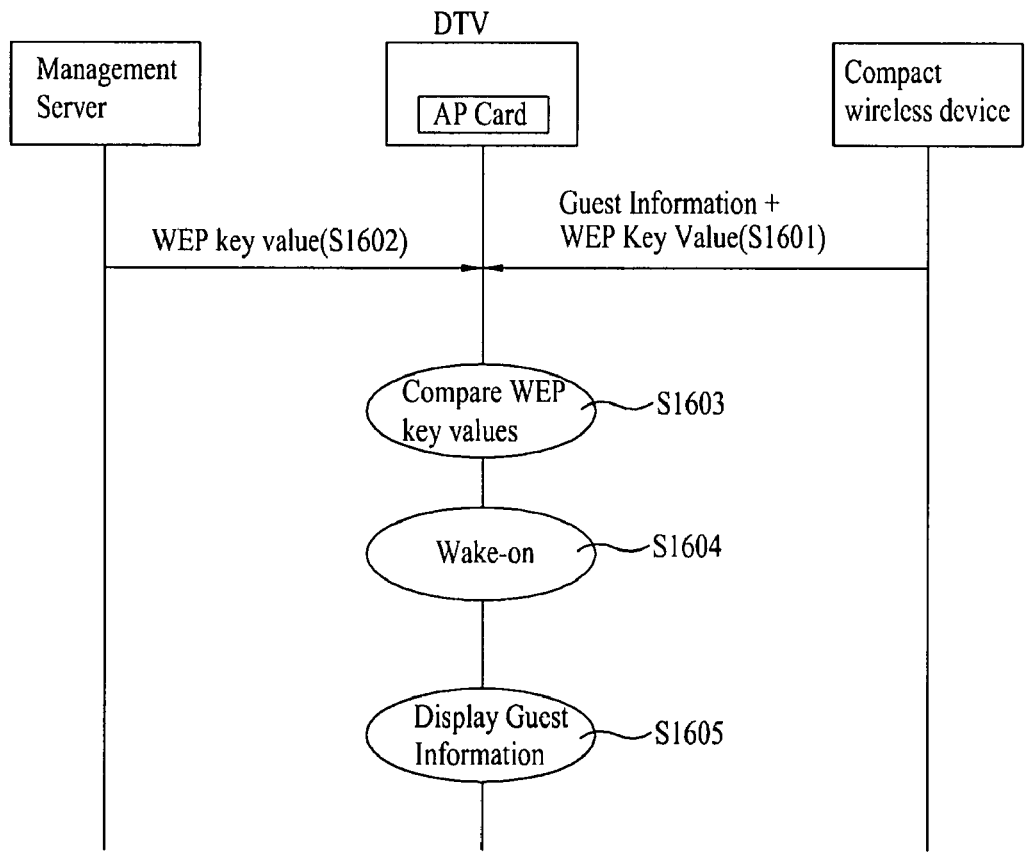
FIG. 15 is a flowchart illustrating a method for selectively waking a DTV located in a specific room using the compact wireless device shown in FIG. 14.
Figure 16:
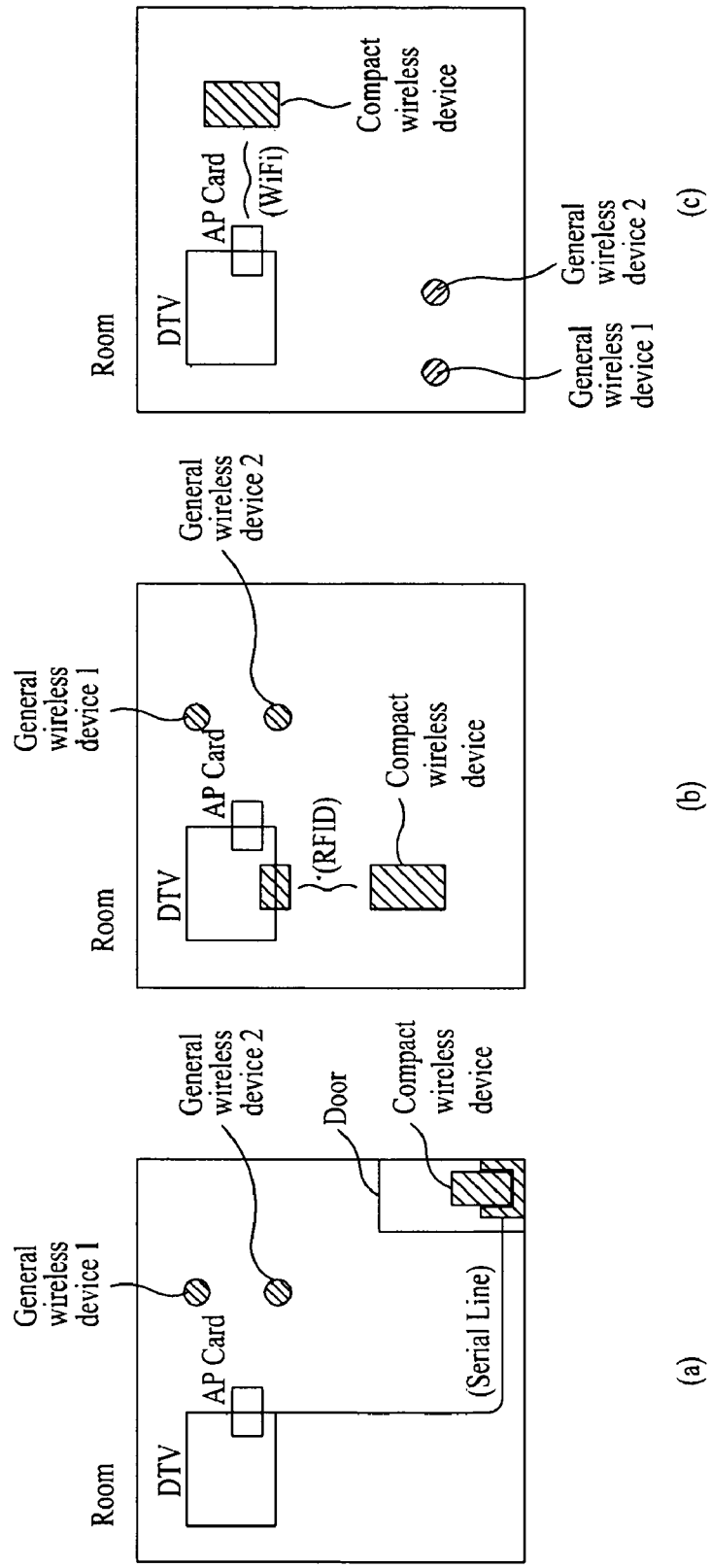
FIG. 16 is a diagram illustrating a procedure for selectively waking a DTV located in a specific room using the compact wireless device shown in FIG. 14.

FIG. 15 is a flowchart illustrating a method for selectively waking a DTV located in a specific room using the compact wireless device shown in FIG. 14. FIG. 16 is a diagram illustrating a procedure for selectively waking a DTV located in a specific room using the compact wireless device shown in FIG. 14.

The compact wireless device according to one embodiment of the present invention stores guest information, room information, and information of devices to be connected to the AP card of the DTV of each room in the RFID tag or memory. In addition, the compact wireless device can automatically change an operation mode of the DTV located at each room of the hotel into a wake mode using the above-mentioned information.

The hotel TV Wake function according to one embodiment of the present invention may allow a guest or user to use the TV of each room using the RFID tag of the compact wireless device or the room information (e.g., TV information mapped to the room) stored in a WLAN memory.

If a guest, who checked in to the hotel and received the compact wireless device from a hotel staff member, enters a corresponding room, guest information, room information, general wireless device information, etc. stored in the RFID tag or the WLAN memory are transmitted to the DTV through the AP card.

Furthermore, the RFID reader may be embedded in the DTV, or may be installed in a key holder located close to the room door. In this case, the RFID reader and the DTV may be connected to each other in series. For example, the RFID reader may be connected to the DTV via RS232 or RS485. Although the RFID reader is contained in the DTV, the DTV and the AP card are connected in series to each other so that they can perform the wake function.

For better understanding of the present invention, FIG. 16(a) shows an exemplary case wherein a key holder located close to the room door serves as the RFID reader. FIG. 16(b) shows an exemplary case wherein the DTV includes the RFID reader. FIG. 16(c) shows an exemplary case wherein the DTV does not have the RFID reader.

In the meantime, the AP card of the DTV and the compact wireless device carry out the authentication procedure using the WEP key value. For example, if a predetermined guest checks in to the hotel, a WEP key value of the AP card mapped to the room number is pre-written in the RFID tag of the compact wireless device. Accordingly, if the above-mentioned guest who has the above compact wireless device enters the corresponding room of the hotel, the compact wireless device communicates with the AP card of the DTV such that it is in an available mode.

In addition, if the AP card recognizes the compact wireless device, the DTV is automatically awakened. In this case, the serial line may be used as necessary.

Therefore, the embodiment of the present invention uses the WEP key value recorded in the compact wireless device, such that it does not generate channel interference with an AP card for another room.

Referring to FIG. 15, the DTV according to one embodiment of the present invention receives guest information recorded in a storage area of the compact wireless device and a WEP key value of the AP card at step S1601. Meanwhile, the DTV according to one embodiment of the present invention may correspond to a DTV contained in one independent space among several independent spaces, and may include an AP card. In addition, for example, several independent spaces physically separated from each other may correspond to several rooms contained in one hotel.

The DTV receives the WEP key value corresponding to the AP card of the DTV from the management server at step S1602. The DTV compares one WEP key value received from the compact wireless device with the other WEP key value received from the management server at step S1603.

If the two WEP key values are identical to each other at step S1603, the DTV is switched from the power-off mode to the wake mode at step S1604. The DTV controls one or more pieces of guest information received from the compact wireless device to be displayed at step S1605.

In addition, the storage area of the compact wireless device may correspond to the RFID tag or the WNAN memory.

An RFID reader is installed at the interior or exterior of the DTV. The RFID reader is mapped to the RFID tag of the compact wireless device. If the RFID reader is located at the exterior of the DTV, the RFID reader and the AP card of the DTV may be connected to each other in series.

Guest information displayed at step S1605 may correspond to a combination of a guest name and a welcome message, or may correspond to other information capable of identifying the guest.

Therefore, the embodiment of the present invention can allow a guest or user who has a right to use a corresponding room to automatically power on the DTV, and can automatically display a unique message customized for the guest.

Figure 17:
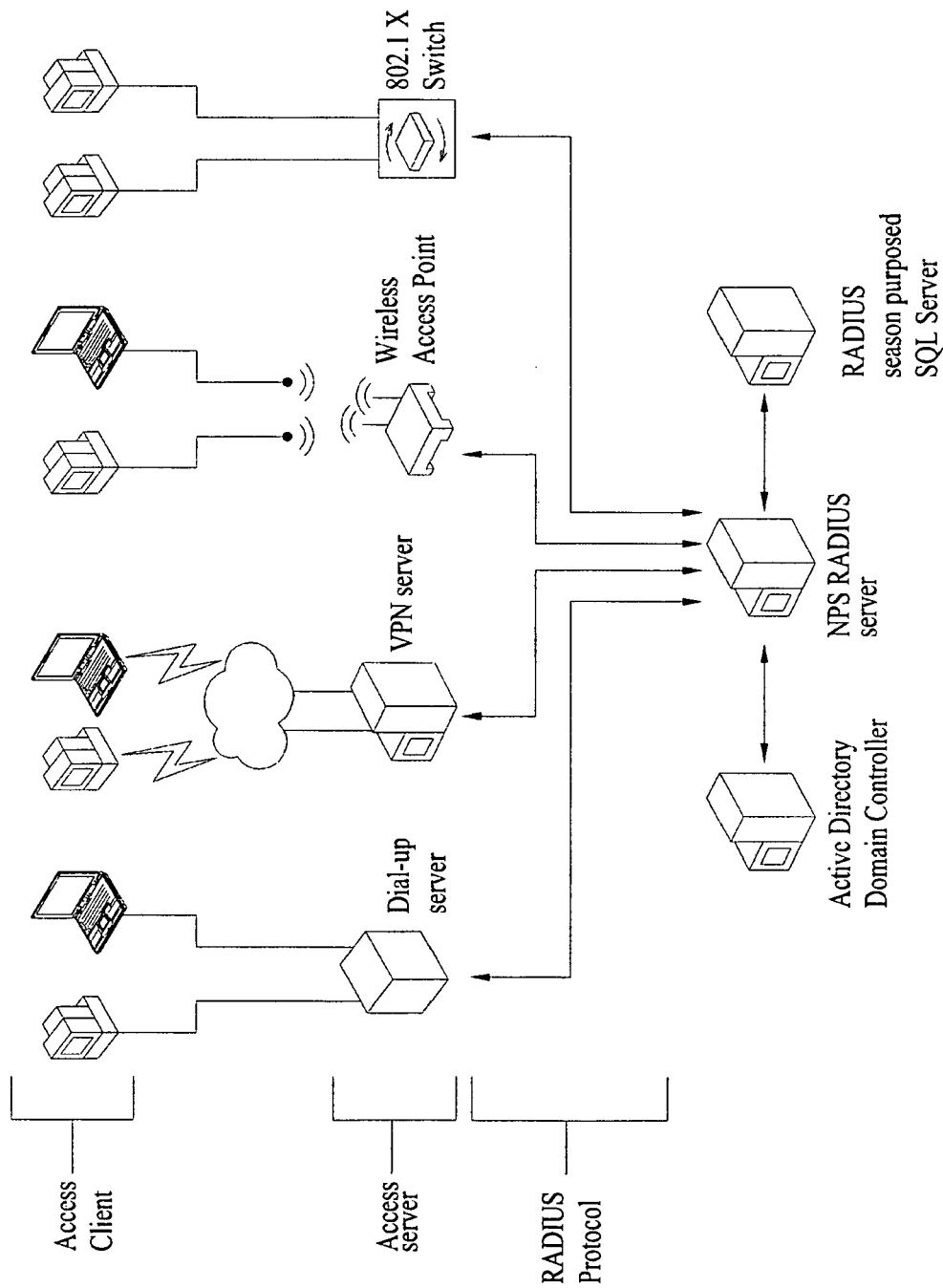
FIG. 17 is a diagram illustrating an overall system including a general authentication server according to the present invention.
Figure 18:
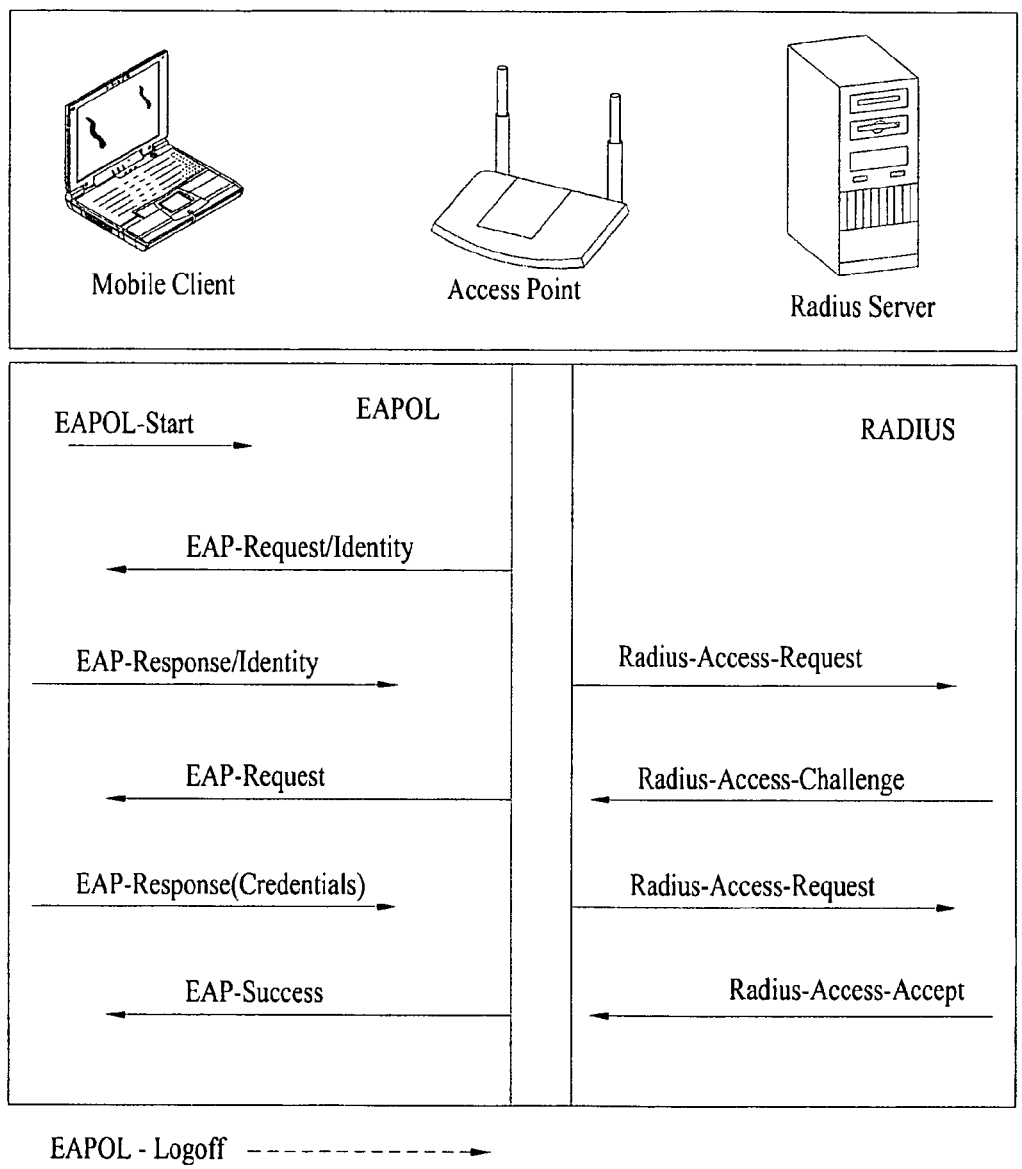
FIG. 18 is a flowchart illustrating operations of a general authentication server according to the present invention.
Figure 20:
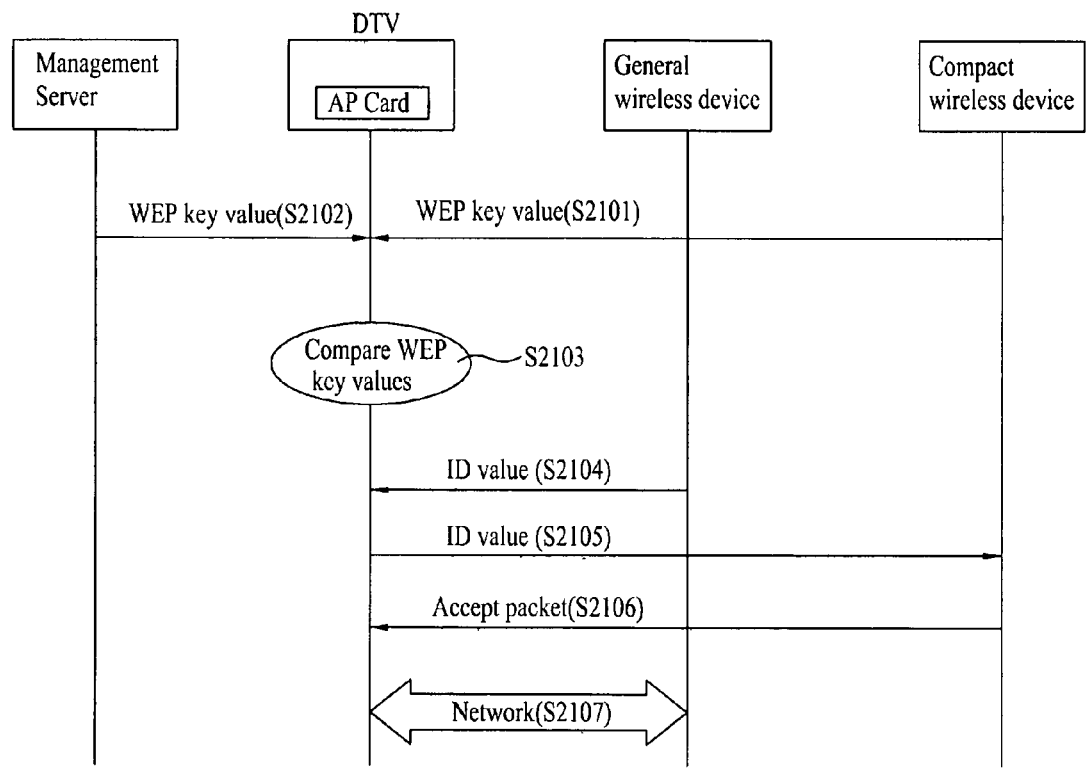
FIG. 20 is a flowchart illustrating an exemplary case in which the compact wireless device shown in FIG. 14 is operated as an authentication server according to one embodiment of the present invention.

FIG. 17 is a diagram illustrating an overall system including a general authentication server according to the present invention. FIG. 18 is a flowchart illustrating operations of a general authentication server according to the present invention. FIG. 19 illustrates a general authentication request packet and a general authentication accept packet according to the present invention. FIG. 20 is a flowchart illustrating an exemplary case in which the compact wireless device shown in FIG. 14 is operated as an authentication server according to one embodiment of the present invention.

The general wireless device (e.g., a WiFi device) under the environment of FIG. 14 may request authentication from the AP card. In accordance with one embodiment of the present invention, the AP card uses the compact wireless device as an authentication server without using an additional authentication server, such that it attempts to perform authentication and decides the allowance or rejection of the authentication.

If the general wireless device such as a WiFi device attempts to access the AP card, the AP card may request authentication from the AP card, the AP card may relay an authentication request signal to the authentication server, and may transmit a response signal to the authentication request signal to the WiFi device. If the response signal is the accept response signal, the AP card allows the WiFi device to normally access the Internet through the AP card.

In the meantime, the 802.1X authentication process indicating one of authentication servers can be operated as follows.

First, a network node (also called a WiFi terminal) transmits an access request message to the AP.

Second, the AP (also called an authenticator) requests a client ID. For example, communication between the network node and the AP may use an EAP encapsulation over LAN (EAPOL) protocol.

Third, the client may reply to the authenticator using the ID packet that has passed the authentication server. Communication between the authenticator and the authentication server is based on the RADIUS format.

Fourth, the authentication server transmits the accept packet to the AP. The authenticator opens the client port, and is then able to process network data traffic.

The above-mentioned first, second, third, and fourth processes may correspond to authentication acquisition processes based on a general authentication server shown in FIG. 17. The above-mentioned processes can be carried out through a packet exchange process shown in FIG. 18.

Referring to FIG. 17, the conventional authentication server according to the related art has an objective to manage the access of a large number of users. However, the authentication server according to the present invention is designed to authenticate a general wireless device (e.g., a WiFi device), an AP card, and a compact wireless device acting as a shadow authentication server, such that it is not necessary to use the complicated authentication method shown in FIG. 18. In addition, using an additional authentication server may cause waste of resources.

On the other hand, according to one embodiment of the present invention, an authentication procedure is more simplified, an unnecessary external server is not used, such that the number of elements causing waste of resources is reduced, and security is increased.

The compact wireless device according to one embodiment of the present invention pre-writes or pre-records information of a general wireless device that desires to access the AP card in the RFID tag, such that the above-mentioned advantages can be achieved.

For example, if a predetermined guest or user who has the compact wireless device enters a corresponding room, the compact wireless device automatically attempts to access the AP card. As previously stated above, since the above-mentioned compact wireless device pre-records the WEP key value of the AP card connected to the DTV of the corresponding room when the guest checks in to the hotel, the above-mentioned compact wireless device can automatically attempt to access the AP card. In other words, the compact wireless device requests connection from the AP card using the pre-stored WEP key value, and the pre-stored WEP key value is identical to a WEP key value owned by the AP card, such that the compact wireless device can immediately access the AP card. By means of the above-mentioned processes, the AP card enters an enable status, i.e., an enable mode. Therefore, other WiFi devices can request connection from the enabled AP card. In the meantime, the AP card and WiFi devices contained in another room have values, each of which is different from the WEP key value of the AP card of a current room, such that channel interference can be eliminated.

Further, the general wireless device (e.g., WiFi device) may request authentication from the AP card. In this case, the compact wireless device can be operated as an authentication server using pre-stored information of the general wireless devices.

Specifically, regardless of which unique value of the registered general wireless device is used, the overlapping or interference problems are not encountered.

In addition, the embodiment of the present invention is advantageous in that it is not necessary for all packets to be parsed and processed. First of all, as shown in FIG. 19, a packet structure located under a Code 1 enables the AP to request authentication from the WLAN terminal, and a packet structure located under a Code 2 enables the WLAN terminal to permit AP authentication. An ID among attributes shown in FIG. 19 may be considered to be an important factor. In more detail, if only the ID can be uniquely maintained, a password (PW) may be used to encrypt and use a corresponding ID. For example, in order to uniquely generate the ID, combination data of a room number and a general wireless device name may be used. If such generated combination data is transferred to the guest and the guest recognizes the generated combination data, the guest who lodges in a corresponding room has only to enter the above-mentioned combination data in authentication client information, such that a unique ID can be generated.

Needless to say, a password can be used in the same manner as the ID without any problems. The AP, that has received the accept packet through the above-mentioned processes, allows the requesting client to connect to the network.

However, it is necessary for the authentication client (e.g., general wireless device) and the AP to sufficiently satisfy the protocol based on the authentication procedure. In other words, although the compact wireless device according to one embodiment of the present invention serves as an authentication server, it is preferable that the remaining general wireless device follow general protocols.

Meanwhile, the shadow authentication server function of the newly defined compact wireless device shown in the present invention means that it is not necessary for all packets to be parsed so as to parse packets transferred from the AP, and only the same field as that of the aforementioned ID is parsed such that it is determined whether or not the general wireless devices are connected to the network. In this case, the packets to be transferred need not follow a general software stack, and have only to transfer the prepared challenge packet and the accept packet to a destination.

Referring to FIG. 20, the DTV according to one embodiment of the present invention receives the AP card WEP key value recorded in a storage area of the compact wireless device at step S2101. Meanwhile, the DTV according to one embodiment of the present invention may correspond to a DTV contained in one of several independent spaces that are physically separated from one another, and may include an AP card.

For example, the aforementioned physically separated independent spaces may correspond to several rooms contained in one hotel. The DTV receives the WEP key value corresponding to the AP card of the above-mentioned DTV from the management server at step S2102.

The DTV compares the WEP key value received from the compact wireless device with the other WEP key value received from the management server at step S2103. If the two WEP key values are identical to each other, the DTV receives ID information of a first general wireless device from the general wireless device at step S2104.

The DTV transmits the first general wireless device ID information to the compact wireless device at step S2105. However, for example, the first general wireless device ID information may correspond to the above-mentioned ID.

If at least one second general wireless device ID information recorded in the storage area of the compact wireless device is identical to the first general wireless device ID information, the DTV receives the Internet service accept packet from the compact wireless device at step S2106.

The DTV controls the general wireless device, such that the general wireless device can use the Internet service through the AP card of the DTV at step S2107.

The second general wireless device ID information is composed of a combination of an ID number of the independent space and the device name. For example, the general wireless device may correspond to the WiFi device desired to be used in the independent space.

Furthermore, the compact wireless device is designed to serve as the shadow authentication server that authenticates the Internet service specific only for the WiFi device desired to be used in the independent space.

Consequently, according to one embodiment of the present invention, security can be increased, and at the same time the Internet service can be quickly provided to devices of each room of the hotel. On the other hand, the related art has authenticated the WiFi device or the like using the WEP key value only. Accordingly, if the WEP key value is exposed to a third party, a user who stays in another room within range of the signal may fraudulently access the corresponding AP, resulting in serious problems in the related art. The embodiment of the present invention carries out the authentication procedure using the compact wireless device instead of the external heavy server, such that costs for the additional server can be greatly reduced.

Figure 21:
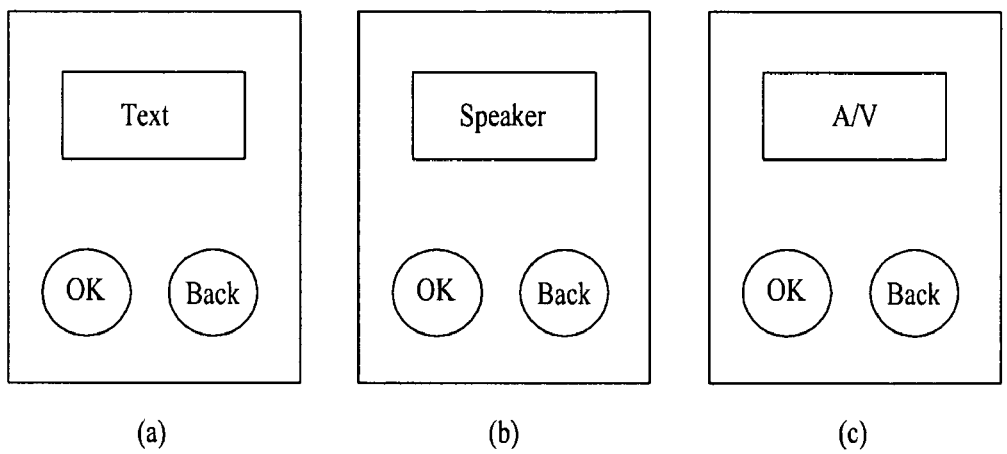
FIG. 21 illustrates three types of compact wireless device according to one embodiment of the present invention.

FIG. 21 illustrates three types of compact wireless device according to one embodiment of the present invention.

Figure 22:
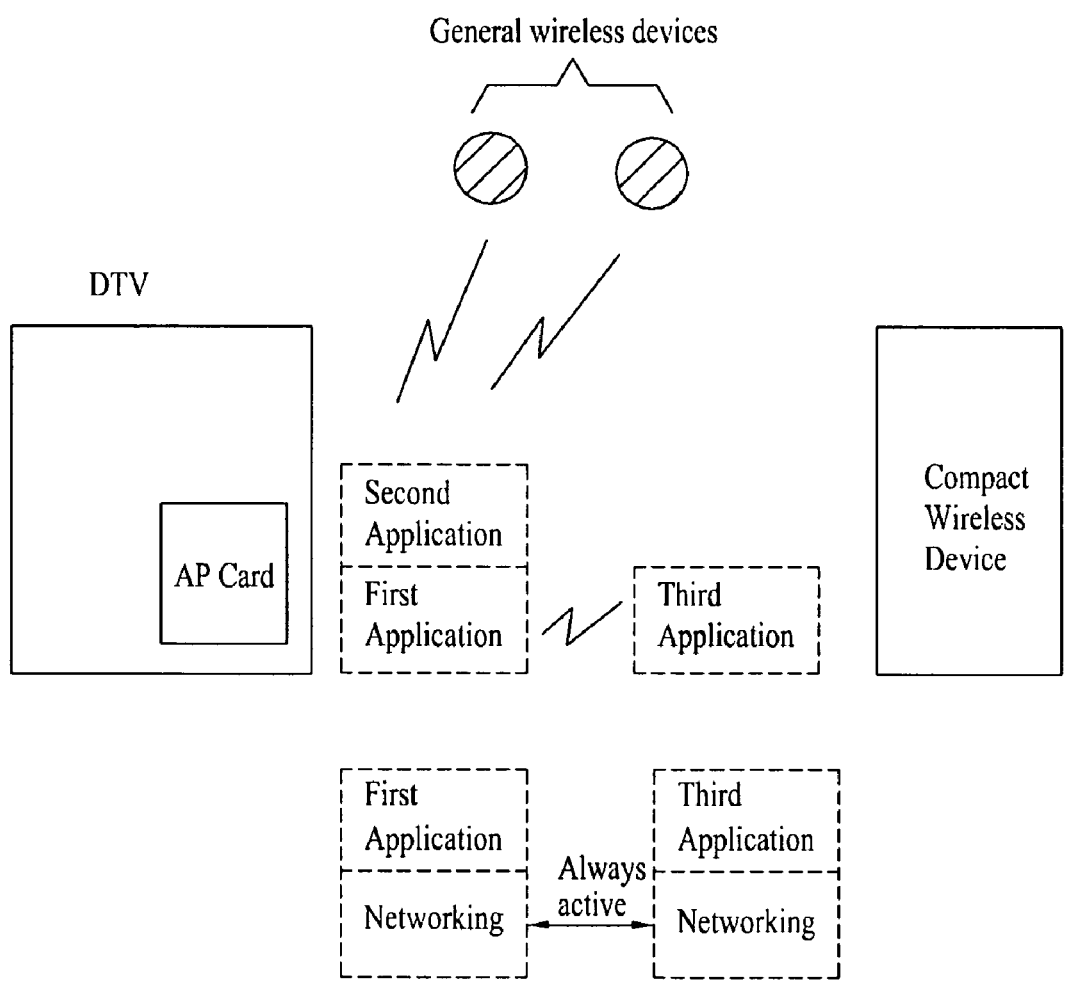
FIG. 22 is a diagram illustrating that the compact wireless device has the same application as the AP card so as to maintain data synchronization according to one embodiment of the present invention.

FIG. 22 is a diagram illustrating that the compact wireless device has the same application as the AP card so as to maintain data synchronization according to one embodiment of the present invention.

Figure 23:
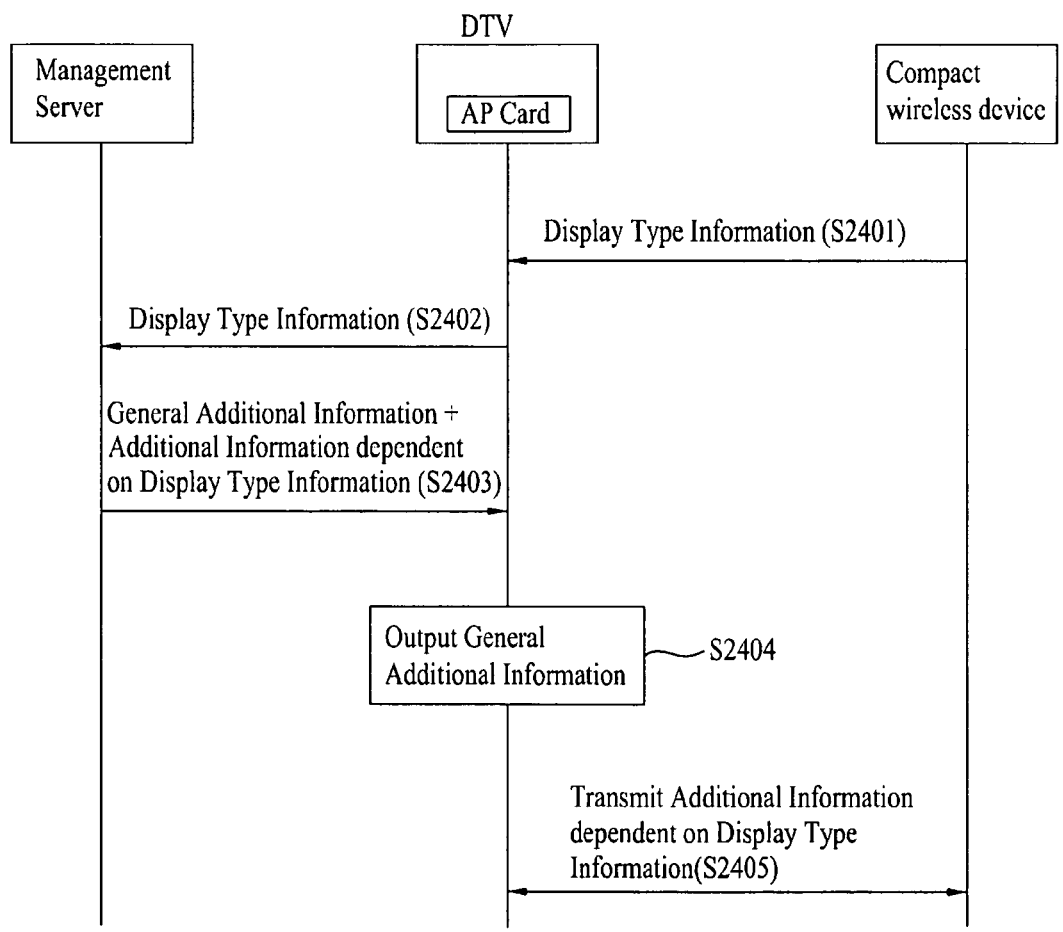
FIG. 23 is a flowchart illustrating a method for transmitting customized additional information in response to a compact wireless device type according to one embodiment of the present invention.

FIG. 23 is a flowchart illustrating a method for transmitting customized additional information in response to a compact wireless device type according to one embodiment of the present invention.

In accordance with the embodiment of the present invention, the AP card of the DTV shown in FIG. 14 and the compact wireless device are synchronized with each other using the specialized applications, such that information is downloaded and the downloaded information is stored. Therefore, if it is assumed that the entire system is designed as described above, the compact wireless device can be configured in various types of UE that maximally satisfies the request of the service provider and has a minimum number of specifications.

The DTV according to one embodiment of the present invention can be connected to the server over the IP Over Cable, and can provide effective information to the guest. Since two-way communication can be achieved in the embodiment of the present invention, user-required information is searched for through the remote-controller input signal of the user, such that the DTV provides effective information to the user by communicating with the connected server. However, the effective information may be, for example, tourist attraction information, restaurant information, weather information, event information, transportation information, etc. However, according to the related art, the above-mentioned information can only be displayed on the DTV, and there is no function for automatically transmitting the above-mentioned information to other devices contained in the hotel. Specifically, the system according to the embodiment of the present invention has an objective to define a new device that can rapidly receive additional information confirmed on the DTV of each room of the hotel. In addition, the system of the present invention is designed to select various device types in terms of costs from the viewpoint of the hotel administrator or hotelier. For convenience of description and better understanding of the present invention, the device is hereinafter referred to as a compact wireless device.

Referring to FIG. 21, the compact wireless device according to one embodiment of the present invention may be any of a device for displaying only text, a device for outputting only sound without displaying the text, and a device for displaying both A/V data and text.

However, in order to provide such services to a specific compact wireless device, the application located between the AP card and the compact wireless device must be designed in the same manner as described above.

In other words, the guest can access information of the server using the DTV, and the requested information is transmitted to the DTV through the IP Over Cable. In this case, the transmitted information is applied to the user through the DTV. Upon receiving a key input signal of the remote controller of the DTV from the user, information displayed on the DTV may be transferred to the compact wireless device. In this case, the DTV receives not only general additional information but also other additional information mapped to the general additional information from the DTV. In other words, although data displayed on the DTV includes A/V data, text data, and voice data, another data to be transmitted from the DTV to the compact wireless device can be configured in various formats according to the compact wireless device types. Therefore, type information of data that can be processed by the compact wireless device is added to information to be transferred from the compact wireless device to the DTV. In this case, when the DTV receives data from the server, the DTV receives a data pair consisting of one data to be reproduced through the DTV and the other data to be downloaded through the DTV, and stores the received data pair in a temporary memory. Upon receipt of a request from the user, the stored data is transferred to the compact wireless device. In this case, the request may be carried out by the remote-controller of the DTV. Upon receipt of the request, the application contained in the DTV may transmit the pre-stored data to the compact wireless device.

Communication between the AP card and the compact wireless device according to one embodiment of the present invention need not include all the general headers (MAC and Ethernet) required for wireless Ethernet communication. In more detail, connection between the AP card and the compact wireless device is carried out through specific applications capable of being synchronized independently of each other, such that it is not necessary for the connection between the AP card and the compact wireless device to have MAC- and IP-associated protocols on the condition that the corresponding application has no problem in sending and downloading such data. Therefore, the application of the present invention can be more simplified than in the related art.

However, according to one embodiment of the present invention, a dual application composed of two applications is included in the AP card. One application is used for communication with a general wireless device such as a WiFi device or the like, such that it is designed to have the same application as the conventional application, and the other application is used for transmission and reception of only data (e.g., A/V data, text data, and voice data) associated with the compact wireless device, such that all heavy protocols can be deleted as described above and can be designed in a simplified format.

Therefore, the AP card according to one embodiment of the present invention generates a packet transmitted to a general WiFi device and a packet transmitted to the compact wireless device in different ways, and transmits the packets in different ways, such that an amount of load caused by headers can be greatly reduced.

Referring to FIG. 22, the applications located between the AP card and the compact wireless device can automatically and continuously maintain an operation status of the network. Further, the AP card unconditionally pushes additional information, etc. generated by the remote-controller key input signal toward the compact wireless device, and the compact wireless device continuously monitors the AP card on the condition that it is continuously connected to the AP card. In this case, if the presence of data transferred from the AP card is determined, this data is stored in the compact wireless device without any change.

Referring to FIG. 23, the DTV according to one embodiment of the present invention receives display type information from the compact wireless device at step S2401. In the meantime, the DTV according to one embodiment of the present invention corresponds to a DTV contained in one independent space from among several independent spaces that are physically separated from one another, and includes an AP card therein. In addition, the physically separated independent spaces may correspond to several rooms contained in one hotel. Further, the display type information means a type of data that can be processed by the compact wireless device. For example, the display type information may correspond to information capable of identifying at least one of an A/V signal output, an audio signal output, and a text signal output.

The DTV transmits the received display type information to the management server at step S2402. The DTV receives general additional information and additional information dependent on the display type information from the management server at step S2403.

The DTV outputs the general additional information at step S2404, and the additional information dependent on the display type information is transmitted to the compact wireless device at step S2405.

In addition, the AP card includes a dual application. The dual application includes a first application for use in the compact wireless device and a second application for use in the general wireless device.

Further, a third application corresponding to the first application for the compact wireless device is stored in the compact wireless device. In order to synchronize data between the first application and the third application, the network of each application is always maintained in the active status.

The AP card transmits the additional information dependent on the display type information to the compact wireless device according to a specific scheme (e.g., a push scheme).

Therefore, according to one embodiment of the present invention, in the case where the DTV connected to the server through the IP Over Cable can receive user-requested additional information, the DTV can quickly download the additional information through the compact wireless device. Also, from the viewpoint of the enterprise, the enterprise can prepare the compact wireless device suitable for a service desired by the enterprise, such that the number of selectable devices is increased, resulting in reduction of costs. Moreover, the application of the AP card of the DTV and the application of the compact wireless device are designed to transmit and receive only agreement data according to the compact wireless device type, such that an amount of general header load can be reduced and a data transmission/reception time can also be greatly reduced.

Figure 24:
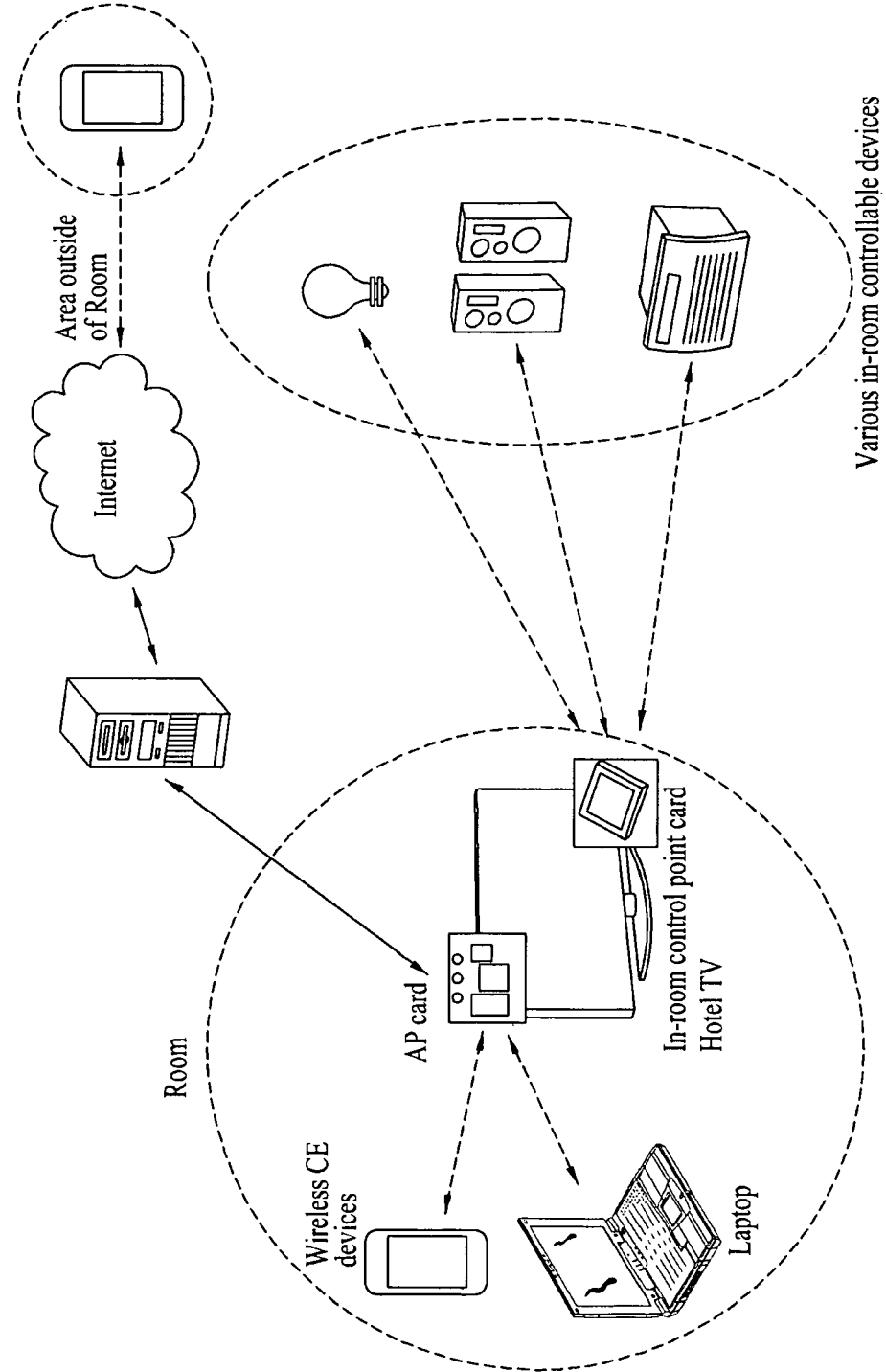
FIG. 24 is a diagram illustrating a method for allowing a guest to control devices at the interior or exterior of a room according to one embodiment of the present invention.

FIG. 24 is a diagram illustrating a method for allowing a quest to control devices at the interior or exterior of a room according to one embodiment of the present invention.

Figure 25:
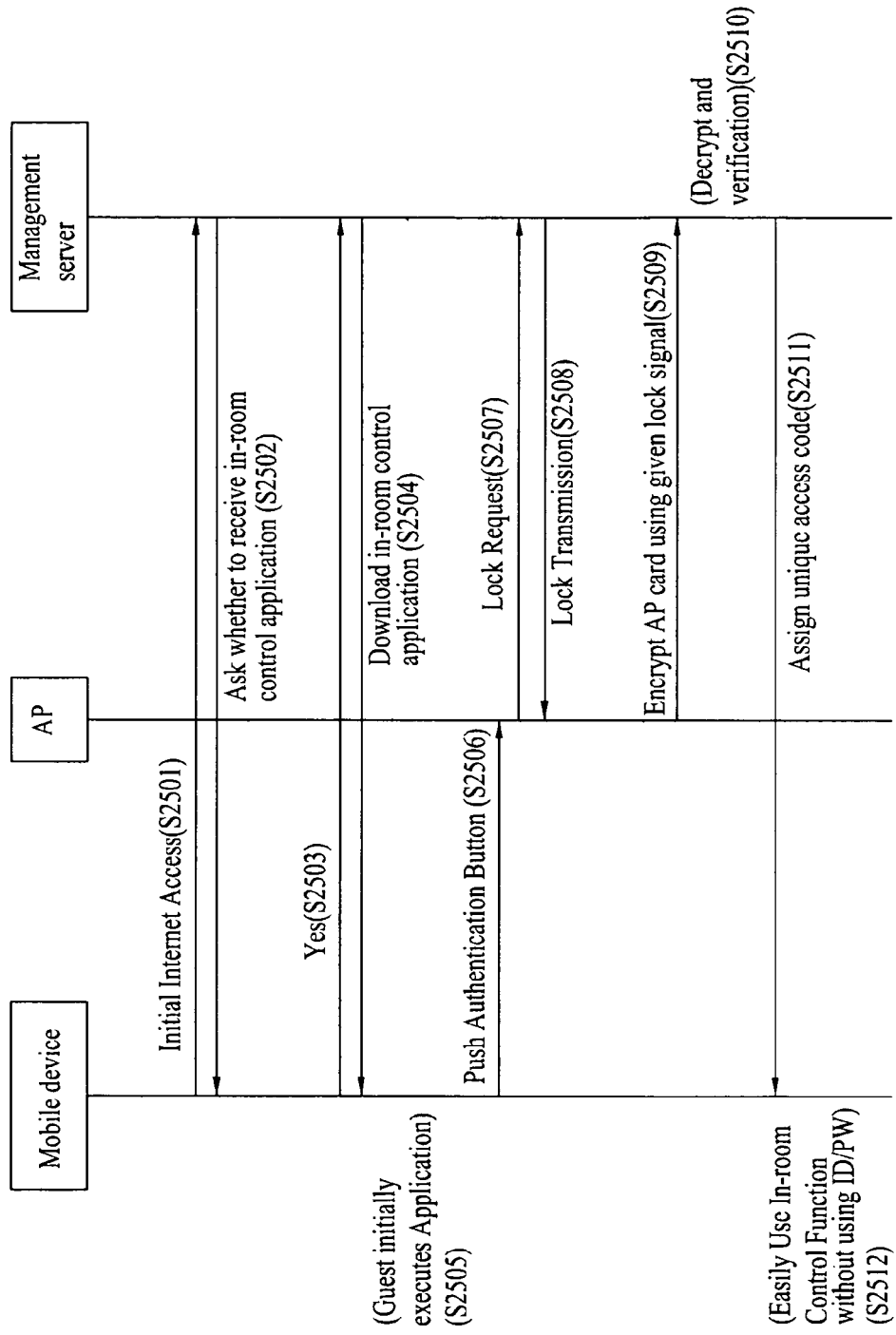
FIG. 25 is a flowchart illustrating a method for allowing a guest to control devices at the interior of a room using a mobile device according to one embodiment of the present invention.

FIG. 25 is a flowchart illustrating a method for allowing a guest to control devices at the interior of a room using a mobile device according to one embodiment of the present invention.

Figure 26:
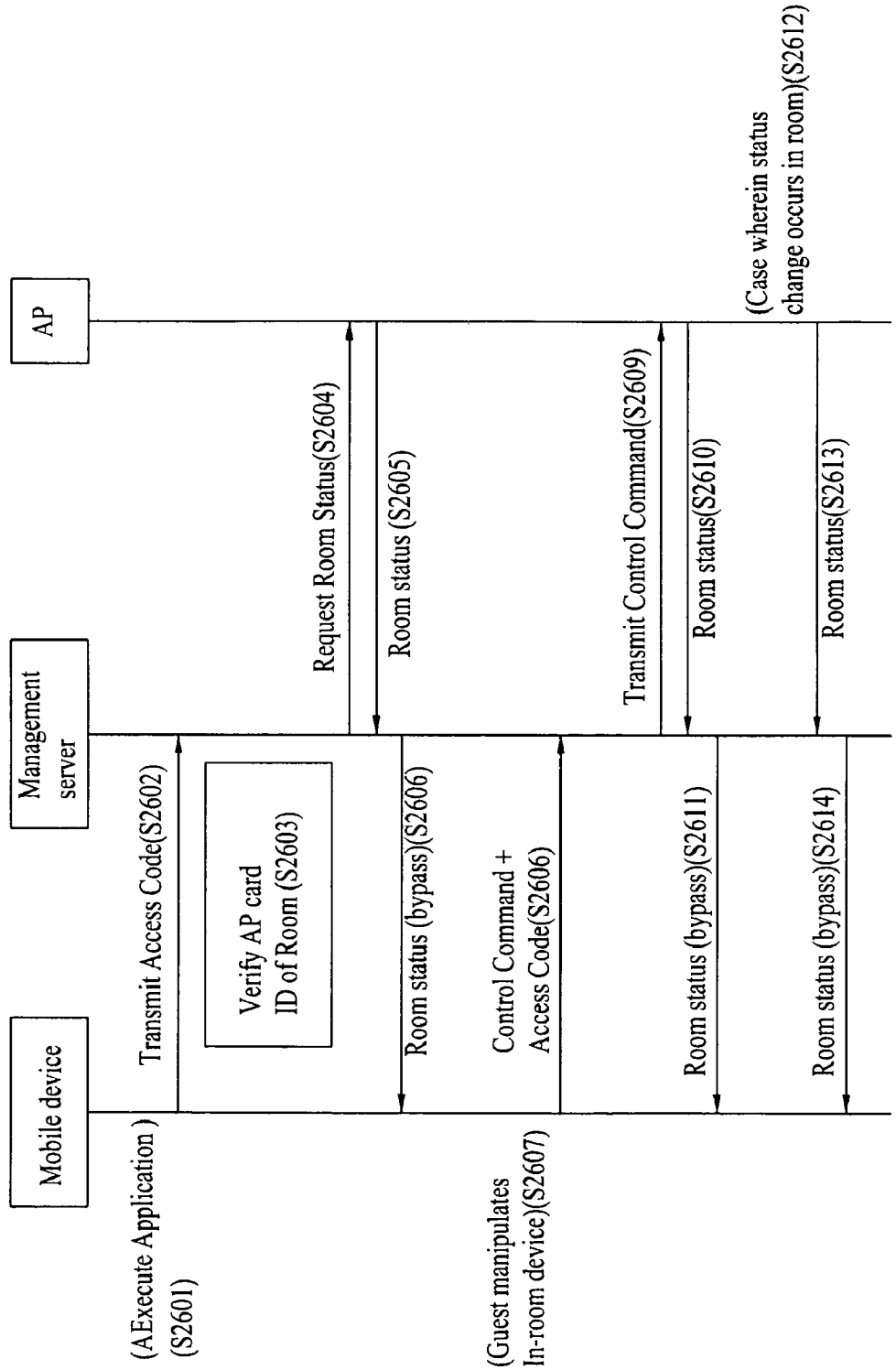
FIG. 26 is a flowchart illustrating a method for allowing a guest to control devices at the exterior of a room using a mobile device according to another embodiment of the present invention.

FIG. 26 is a flowchart illustrating a method for allowing a guest to control devices at the exterior of a room using a mobile device according to another embodiment of the present invention.

Generally, in order to allow the guest to access a control box for controlling Heating, Ventilation, and Air Conditioning (HVAC), it is necessary for the guest to use a mobile device that uses a private protocol (e.g., a home network-associated protocol for controlling HVAC) of a manufacturer of the control box. However, if the guest uses the mobile device manufactured by the control box manufacturer, there is a high possibility of danger in that the guest may unexpectedly lose or damage the mobile device.

In addition, under the condition that a guest who lodges in the same room is changed to another guest at any time, the related art has a disadvantage in that not only an authorized guest of a specific room but also unauthorized guests may use the control box of the specific room.

Therefore, the embodiment of the present invention provides an in-room control function to the mobile device carried by the guest only while the guest lodges in the hotel, such that it inherently prevents additional costs caused by the damage or loss of the mobile device.

In addition, the embodiment of the present invention aims to realize the in-room control function at the exterior of the room. However, the in-room control function means that various devices (e.g., TV, air conditioner, gas heater, etc.) contained in the room assigned to the guest are controlled by one device.

Further, the embodiment of the present invention takes into consideration the fact that a guest who lodges in one room of the hotel is changed to another guest at any time. Although a mobile device of the guest is used, there is no problem in security and the in-room function can be easily provided to the guest.

In brief, the system according to the embodiment of the present invention may download the application for controlling the in-room control point card into the mobile device located in the room, such that a guest who lodges in the room of the hotel can control various devices contained in the room using the AP card installed in each room. For example, the mobile device may be a mobile phone carried by the guest. Therefore, the in-room control operation is achieved using the mobile device in which the aforementioned application is downloaded.

Further, as shown in FIG. 24, when the mobile device (e.g., a wireless CE device) is present in the room or is present in an Internet accessible area located outside of the room, the aforementioned in-room control can be achieved.

First of all, the mobile device according to the embodiment of the present invention gains access to the management server using the AP card mounted to the DTV, and downloads the in-room control application from the management server. In the meantime, the mobile device and the AP card according to the embodiment of the present invention may transmit and receive signals using a wireless communication scheme. The wireless communication scheme may be, for example, Wireless Local Area Network (WLAN), IEEE 802.11, IEEE 802.16, IEEE 802.20, or the like.

In addition, the mobile device requests a unique access code from the management server using the AP card when the downloaded in-room control application is executed. However, the unique access code is mapped to the AP card ID and an available term of a current guest who stays in the independent space. Accordingly, the unique access code can prevent a guest staying in another room from fraudulently using the mobile device. In addition, if the guest available term has expired, the unique access code is designed to stop the in-room control function.

The mobile device receives a unique access code from the management server, and transmits not only a command signal for changing a status of a controllable device contained in the independent space but also the received unique access code to the AP card of the DTV.

Therefore, the in-room control point card of the DTV code can control various devices of the room in response to the received command signal. However, the in-room control point card may be located outside of the DTV.

Moreover, another embodiment of the present invention may realize the in-room control function by enabling the guest to use the mobile device at the Internet accessible space located outside of the room.

For example, the mobile device located at the exterior of the independent space transmits the unique access code to the management server. Needless to say, the exterior part including the mobile device is located at the Internet accessible area. In addition, the mobile device receives the current room status information from the management server that has received the current room status information of the independent space. In other words, in accordance with this embodiment of the present invention, a guest can freely monitor a current status of the room assigned to the guest at any time.

For another example, the mobile device located at the exterior of the independent space transmits the unique access code and the command signal for changing the status of the controllable device belonging to the independent space to the management server. Needless to say, the exterior part including the mobile device is located at the Internet accessible area. After the command signal is transmitted from the management server to the AP card, the mobile device receives the current room status information from the management server that has received the current room status information of the independent space from the AP card. In other words, in accordance with this embodiment of the present invention, a guest can freely monitor a current status of the room assigned to the guest at any time.

For example, the plurality of independent spaces physically separated from each other may correspond to several rooms belonging to one hotel.

The above-mentioned operations will hereinafter be described with reference to FIGS. 25 and 26.

Referring to FIG. 25, the mobile device gains access to the management server over the Internet at step S2501. The management server transmits specific information for determining whether to download the in-room control application to the mobile device at step S2502.

If the mobile device transmits a signal indicating the intention of downloading the in-room control application to the management server at step S2503, the mobile device downloads the in-room control application from the management server at step 2504.

The mobile device executes the downloaded application at step S2505, and transmits a request signal for authentication to the AP card at step S2506. However, as described above, the AP card may be installed into the DTV.

The AP card transmits a lock request signal to the management server at step S2507, and the management server transmits the lock signal to the AP card at step S2508. The management server encrypts the AP card ID using the received lock signal at step S2509.

The management server decrypts the encrypted AP card ID, and completes verification at step S2510. Further, after completing the verification, the management server transmits a unique access code to the mobile device at step S2511. Therefore, since the mobile device has received the unique access code, it can easily implement the in-room control function without using ID and password (PW) information at step S2512.

Accordingly, in the case of using the secured certification system shown in FIG. 25, the in-room control function can be provided only to the corresponding room, and the inconvenience of using additional ID and password information is minimized.

In the meantime, after the mobile device is assigned a unique access code, the in-room control function may be used even at the exterior of the corresponding room on the assumption that a room available term of the guest is not expired. A detailed description thereof will hereinafter be described with reference to FIG. 26.

Referring to FIG. 26, the mobile device executes the downloaded application of FIG. 25 at step S2601, and transmits the received unique access code to the management server at step S2602. The management server verifies the AP card ID of the corresponding room using the received unique access code at step S2603. That is, the management server includes a table to which the AP card ID and the unique access code are mapped.

If the verification is completed, the management server transmits the room status request signal to the AP card at step S2604. The management server receives the room status information from the AP card at step S2605. Further, the room status information is bypassed to the mobile device at step S2606. Therefore, although the mobile device is located outside of the room, it can freely monitor the current room status at any time.

Meanwhile, if the guest desires to manipulate any device contained in the room using the in-room control function at step S2607, the mobile device transmits a device control command and unique access code information to the management server at step S2608. The management server transmits the device control command to the AP card at step S2609. In this case, the AP card controls the in-room control point card shown in FIG. 24, such that it can control the corresponding device in response to the device control command.

After the AP card has controlled the corresponding device, the AP card transits the room status information to the management server at step S2610. The room status information is bypassed to the mobile device at step S2611.

Otherwise, if there is a status change in any device contained in the room of the guest, the changed room status information is transmitted to the management server at step S2613. The room status information is bypassed to the mobile device at step S2614.

As described above, the management server receives the unique access code, and authenticates an ID of a target AP card using the mapping table. As a result, if a new guest checks in to the hotel or a current guest checks out of the hotel, the unique access code of the mapping table is changed at random, such that the management server can prevent the corresponding room from being controlled by an unauthorized person or an unauthorized mobile device.

In the meantime, the product invention and the process invention have been disclosed in the present invention, and the product invention may be complementary to the process invention as necessary.

The method disclosed in the present invention may be implemented in the form of program commands executable by a variety of computer means, and recorded on a computer-readable recording medium.

The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler.

The above-stated hardware devices may be configured to operate as one or more software modules to perform the operation of the present invention, and vice versa. Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

As apparent from the above description, the present invention provides a technology for automatically generating customized service information, and provides the customized service information to a guest who uses a hotel or the like. In addition, the present invention can provide a technology for providing the customized service information and at the same time improving security.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a mobile device capable of accessing an access point (AP) card of a digital television (DTV) located in one independent space among a plurality of independent spaces physically separated from one another, the method comprising:
   accessing a management server using the AP card;
   downloading an in-room control application from the management server;
   requesting an authentication to the AP card, wherein the AP card transmits a lock request signal to the management server, receives a lock signal and transmits an encrypted AP card ID using the lock signal to the management server;
   executing the downloaded in-room control application enabling a user to control device of the independent space using the AP card and DTV, wherein the AP card supports a multi-protocol interface to control devices of the independent spaces and the DTV displays a list and positions of the devices;
   requesting a unique access code from the management server using the AP card, wherein the unique access code is mapped to both an identifier (ID) of the AP card and an available term assigned to a current guest staying in the independent space;
   receiving the unique access code from the management server, if the management server completes verification by decrypting the encrypted AP card ID; and
   transmitting a command signal for changing a status of a controllable device contained in the independent space and the received unique access code to the AP card of the DTV.

2. The method according to claim 1, further comprising:
   transmitting the unique access code to the management server at an exterior area of the independent space, wherein the exterior area is located at an Internet accessible area; and receiving the current room status information from the management server that has received the current room status information of the independent space from the AP card.

3. The method according to claim 1, further comprising:
transmitting the unique access code and the command signal for changing a status of the controllable device contained in the independent space to the management server at an exterior area of the independent space, wherein the exterior area is located at an Internet accessible area; and transmitting the command signal from the management server to the AP card, and receiving the current room status information from the management server that has received the current room status information of the independent space from the AP card.

4. The method according to claim 1, wherein the independent spaces physically separated from one another correspond to several rooms contained in one hotel.

* * * * *